US012563364B2

(12) United States Patent
Yang et al.

(10) Patent No.: US 12,563,364 B2
(45) Date of Patent: Feb. 24, 2026

(54) USER EQUIPMENT POSITIONING METHOD AND APPARATUS

(71) Applicant: HUAWEI TECHNOLOGIES CO., LTD., Shenzhen (CN)

(72) Inventors: Mingyue Yang, Shanghai (CN); Runze Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 338 days.

(21) Appl. No.: 18/325,612

(22) Filed: May 30, 2023

(65) Prior Publication Data

US 2023/0308833 A1 Sep. 28, 2023

Related U.S. Application Data

(63) Continuation of application No. PCT/CN2020/132987, filed on Nov. 30, 2020.

(51) Int. Cl.
*H04W 4/02* (2018.01)
*H04W 64/00* (2009.01)

(52) U.S. Cl.
CPC ......... *H04W 4/023* (2013.01); *H04W 64/003* (2013.01)

(58) Field of Classification Search
CPC ............................ H04W 4/023; H04W 64/003
See application file for complete search history.

(56) References Cited

U.S. PATENT DOCUMENTS

| | | | |
|---|---|---|---|
| 2011/0098059 A1 | 4/2011 | Qiu et al. | |
| 2017/0171701 A1 | 6/2017 | Zhou | |
| 2019/0028994 A1 | 1/2019 | Tenny | |
| 2022/0007326 A1 * | 1/2022 | Zhang ................... | G01S 5/0036 |

FOREIGN PATENT DOCUMENTS

| | | | | | |
|---|---|---|---|---|---|
| CN | 103763768 A | * | 4/2014 | .............. | H04W 8/16 |
| CN | 106662634 A | | 5/2017 | | |
| EP | 4175374 A1 | * | 5/2023 | .............. | G01S 5/02 |

OTHER PUBLICATIONS

Japanese Office Action issued in corresponding Japanese Patent Application No. 2023-532720, dated Sep. 17, 2024, pp. 1-7.
Nokia, Add Location Services procedures dedicated to regulatory use case and the positioningprocedures to the new TS, 3GPP TS-SA WG2 Meeting S2-1900494, Jan. 25, 2019, total 8 pages.
Chinese Office Action issued in corresponding Chinese Application No. 202080107463.1, dated Jun. 25, 2024, pp. 1-18.
3GPP TS 23.501 V16.6.0 (Sep. 2020), 3rd Generation Partnership Project, Technical Specification Group Services and System Aspects, System architecture for the 5G System (5GS), total 438 pages.

* cited by examiner

*Primary Examiner* — Erika A Washington
(74) *Attorney, Agent, or Firm* — HAUPTMAN HAM, LLP

(57) ABSTRACT

A user equipment positioning method includes sending, by a first network element, a first positioning request message to a second network element. The first positioning request message indicates the second network element to position first user equipment (UE) through second UE. The method also includes receiving, by the first network element, a first positioning request response message sent by the second network element. The first positioning request response message includes first location information of the first UE.

19 Claims, 15 Drawing Sheets

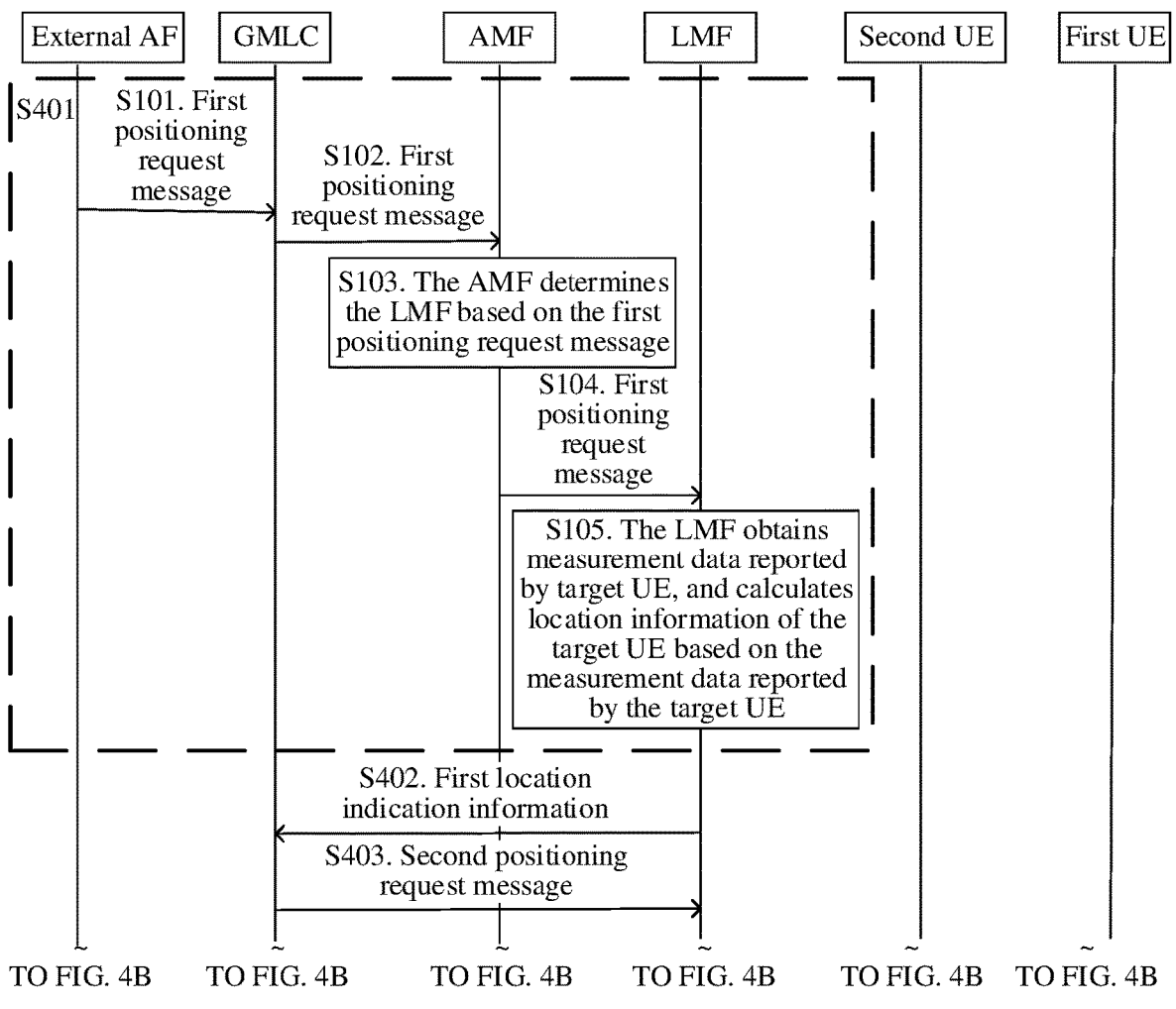

S401

S101. First positioning request message

S102. First positioning request message

S103. The AMF determines the LMF based on the first positioning request message

S104. First positioning request message

S105. The LMF obtains measurement data reported by target UE, and calculates location information of the target UE based on the measurement data reported by the target UE S402. First location indication information S403. Second positioning request message External AF     GMLC     AMF     LMF     Second UE     First UE TO FIG. 4B     TO FIG. 4B     TO FIG. 4B     TO FIG. 4B     TO FIG. 4B     TO FIG. 4B

FIG. 4A

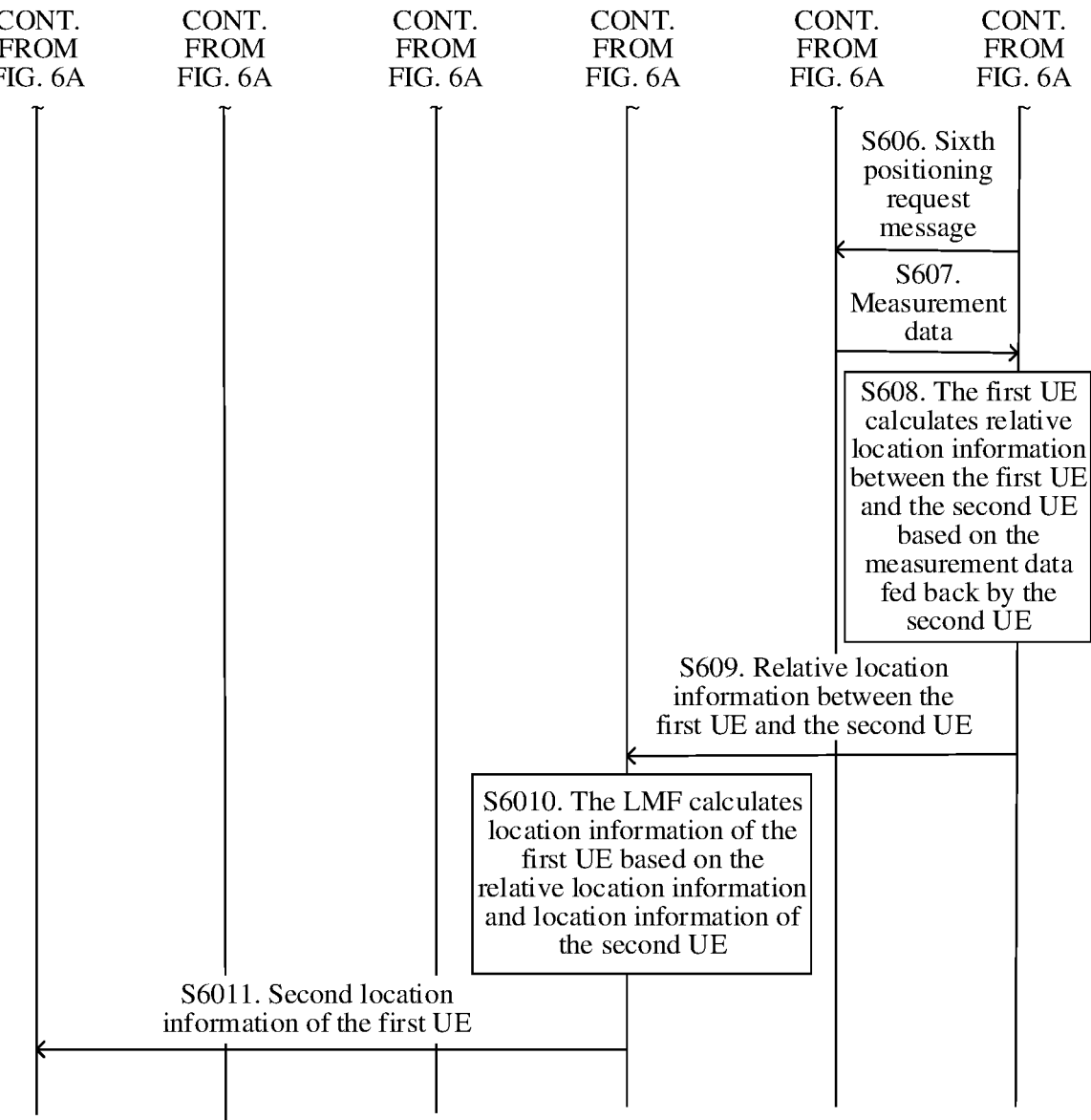

CONT.
FROM
FIG. 6A

CONT.
FROM
FIG. 6A

CONT.
FROM
FIG. 6A

CONT.
FROM
FIG. 6A

CONT.
FROM
FIG. 6A

CONT.
FROM
FIG. 6A

S606. Sixth
positioning
request
message

S607.
Measurement
data

S608. The first UE
calculates relative
location information
between the first UE
and the second UE
based on the
measurement data
fed back by the
second UE S609. Relative location
information between the
first UE and the second UE S6010. The LMF calculates
location information of the
first UE based on the
relative location information
and location information of
the second UE S6011. Second location
information of the first UE

USER EQUIPMENT POSITIONING METHOD AND APPARATUS

CROSS-REFERENCE TO RELATED APPLICATIONS

This application is a continuation of International Application No. PCT/CN2020/132987, filed on Nov. 30, 2020, the disclosure of which is hereby incorporated by reference in its entirety.

TECHNICAL FIELD

This application relates to the field of communication technologies, and in particular, to a user equipment positioning method and apparatus.

BACKGROUND

Support of a positioning service is introduced to the 3rd generation partnership project (3GPP). The positioning service has become an important value-added service in a wireless communication network.

At present, when target user equipment (UE) is positioned, generally, the target UE collects information such as signal strength of the target UE and signal strength of a surrounding base station, and then sends the collected information to a core network, and the core network calculates location information of the target UE based on the information collected by the target UE. When the target UE is located indoors, the signal strength collected by the target UE may become weak due to blocking of a building or a network dead angle, and consequently, the calculated location information of the target UE is not precise enough.

SUMMARY

This application provides a user equipment positioning method and apparatus, to improve accuracy of positioning UE.

According to a first aspect, this application provides a user equipment positioning method. The method includes: A first network element sends a first positioning request message to a second network element. The first positioning request message indicates the second network element to position first user equipment UE through second UE. The first network element receives a first positioning request response message sent by the second network element. The first positioning request response message includes first location information of the first UE.

According to the foregoing technical solution, the second network element may position target UE through another UE, and obtain a relative location between the another UE and the target UE through the another UE, to obtain location information of the target UE. Compared with a method in a conventional technology in which the target UE measures signal strength of a surrounding base station, this manner can collect more accurate measurement data. Therefore, accuracy of positioning the target UE is higher.

It should be noted that, in this embodiment of this application, "another UE" may also be referred to as "auxiliary UE", "Help UE", or "second UE". A person skilled in the art should understand that the two have a same meaning.

In a possible design, the first positioning request message includes at least one of the following information: identification information of the first UE, identification information of the second UE, or positioning precision information.

According to the foregoing technical solution, the first positioning request message sent by the first network element to the second network element may include the identification information of the first UE, the identification information of the second UE, or the positioning precision information. In this way, the second network element may position the first UE based on the identification information of the second UE.

In a possible design, before that a first network element sends a first positioning request message to a second network element, the method further includes: The first network element sends a second positioning request message to the second network element. The second positioning request message indicates the second network element to position the first UE. The first network element receives a second positioning request response message sent by the second network element. The second positioning request response message includes second location indication information of the first UE. The second location indication information indicates that precision information of a second location of the first UE does not meet the positioning precision information, or indicates second location information of the first UE.

According to the foregoing technical solution, the first network element may know, based on the positioning request response message fed back by the second network element, whether approximate location of the target UE or the location information of the target UE that is calculated by the second network element meets a precision requirement.

In a possible design, that a first network element sends a first positioning request message to a second network element includes:

The first network element sends the first positioning request message to the second network element based on the second location indication information of the first UE.

According to the foregoing technical solution, the first network element may send the first positioning request message to the second network element when the location information of the target UE that is calculated by the second network element does not meet the precision requirement, or may determine, based on the location information of the target UE and the precision requirement in the positioning request message, whether the location information of the target UE that is calculated by the second network element meets the precision requirement, and send the first positioning request message to the second network element when the location information does not meet the precision requirement, so that the second network element positions the target UE based on another UE. Therefore, the accuracy of positioning the target UE is improved.

According to a second aspect, this application provides a user equipment positioning method. The method includes: A second network element receives a first positioning request message sent by a first network element. The first positioning request message indicates the second network element to position first user equipment UE through second UE. The second network element positions the first UE through the second UE, and sends a first positioning request response message to the first network element. The first positioning request response message includes location information of the first UE.

According to the foregoing technical solution, the second network element may position target UE based on the first positioning request message sent by the first network element, to calculate location information of the target UE through auxiliary UE, and improve accuracy of positioning the target UE.

In a possible design, the first positioning request message includes at least one of the following information: identification information of the first UE, identification information of the second UE, or positioning precision information.

According to the foregoing technical solution, the second network element may position the target UE based on the identification information of the target UE, identification information of the auxiliary UE, and the positioning precision information that are sent by the first network element, to improve the accuracy of positioning the target UE.

In a possible design, that the second network element positions the first UE through the second UE includes: The second network element sends a third positioning request message to the second UE. The third positioning request message indicates the second UE to determine relative location information between the second UE and the first UE. The third positioning request message includes the identification information of the first UE. The second network element receives the relative location information sent by the second UE, and determines location information of the second UE based on the identification information of the second UE. The second network element determines the location information of the first UE based on the relative location information and the location information of the second UE.

According to the foregoing technical solution, the second network element sends the positioning request message to the auxiliary UE, so that the auxiliary UE calculates a relative location between the target UE and the auxiliary UE, and then the second network element calculates the location information of the target UE based on the relative location and location information of the auxiliary UE.

In a possible design, before that the second network element sends a third positioning request message to the second UE, the method further includes: The second network element obtains the identification information of the second UE.

In this embodiment of this application, the second network element may obtain the identification information of the second UE in the following several manners:

Manner 1: Obtaining the identification information of the second UE from a third network element (for example, an AMF)

Manner 2: Obtaining the identification information of the second UE from the first network element Manner 3: Obtaining the identification information of the second UE based on registration information of the second UE In the foregoing manners, the second network element may obtain the identification information of the auxiliary UE, and further send the positioning request message to the auxiliary UE, so that the auxiliary UE can calculate the relative location between the auxiliary UE and the target UE.

In a possible design, that the second network element positions the first UE through the second UE includes:

The second network element sends a fourth positioning request message to the first UE. The fourth positioning request message indicates the first UE to determine relative location information between the first UE and the second UE. The fourth positioning request message includes the identification information of the second UE. The second network element receives the relative location information sent by the first UE, and determines location information of the second UE based on the identification information of the second UE. The second network element determines the location information of the first UE based on the relative location information and the location information of the second UE.

According to the foregoing technical solution, the target UE may calculate a relative location between the target UE and the auxiliary UE based on the positioning request message, and then send the relative location to a core network, and the core network calculates the location information of the target UE based on the relative location and location information of the auxiliary UE.

According to a third aspect, this application provides a user equipment positioning method. The method includes: Second UE sends a first registration request message to a second network element. The first registration request includes identification information of the second UE and capability information of the second UE. The second UE receives a third positioning request message sent by the second network element. The third positioning request message indicates the second UE to determine relative location information between the second UE and first UE. The third positioning request message includes identification information of the first UE.

According to the foregoing technical solution, auxiliary UE may report identification information, capability information, and the like of the auxiliary UE in a registration process. In this way, another network element may obtain related information of the auxiliary UE, and further use the auxiliary UE to position target UE, to improve accuracy of positioning the target UE.

In a possible design, the method further includes: The second UE sends the relative location information between the second UE and the first UE to the second network element.

According to the foregoing technical solution, after calculating relative location information between the auxiliary UE and the target UE, the auxiliary UE may send the relative location information to the second network element, so that the second network element calculates location information of the target UE.

In a possible design, the method further includes: The second UE sends a fifth positioning request message to the first UE. The fifth positioning request message includes a positioning algorithm. The fifth positioning request message indicates the first UE to obtain measurement data based on the positioning algorithm. The second UE receives the measurement data sent by the first UE.

According to the foregoing technical solution, the auxiliary UE may send the positioning request message to the target UE, so that the target UE obtains the measurement data required for positioning location information, and then the auxiliary UE may calculate relative location information between the auxiliary UE and the target UE based on the measurement data fed back by the target UE.

According to a fourth aspect, this application provides a user equipment positioning apparatus. The user equipment positioning apparatus has a function of implementing the first network element in the method examples in the first aspect. The function may be implemented by hardware, or may be implemented by hardware executing corresponding software. The hardware or the software includes one or more modules corresponding to the foregoing function. In a possible design, the user equipment positioning apparatus includes a sending unit and a receiving unit. The sending unit is configured to send a first positioning request message to a second network element. The first positioning request message indicates the second network element to position first user equipment UE through second UE. The receiving unit is configured to receive a first positioning request response message sent by the second network element. The first positioning request response message includes first location information of the first UE. These units may perform corresponding functions in the method examples in the first aspect. For details, refer to detailed descriptions in the method examples. Details are not described herein again.

According to a fifth aspect, this application provides a user equipment positioning apparatus. The user equipment positioning apparatus has a function of implementing the second network element in the method examples in the second aspect. The function may be implemented by hardware, or may be implemented by hardware executing corresponding software. The hardware or the software includes one or more modules corresponding to the foregoing function. In a possible design, the user equipment positioning apparatus includes: a receiving unit, configured to receive a first positioning request message sent by a first network element, where the first positioning request message indicates the second network element to position first user equipment UE through second UE; a positioning unit, configured to position the first UE through the second UE; and a sending unit, configured to send a first positioning request response message to the first network element, where the first positioning request response message includes location information of the first UE. These units may perform corresponding functions in the method examples in the second aspect. For details, refer to the detailed descriptions in the method examples. Details are not described herein again.

According to a sixth aspect, a user equipment positioning apparatus is provided. The user equipment positioning apparatus may be the first network element in the foregoing method embodiments, or may be a chip disposed in the first network element. The apparatus includes a receiver, a transmitter, and at least one processor. The receiver is configured to perform a message receiving operation performed by the user equipment positioning apparatus in the method according to any one of the first aspect or the implementations of the first aspect. The transmitter is configured to perform a message sending operation performed by the user equipment positioning apparatus in the method according to any one of the first aspect or the implementations of the first aspect.

According to a seventh aspect, a user equipment positioning apparatus is provided. The user equipment positioning apparatus may be the second network element in the foregoing method embodiments, or may be a chip disposed in the second network element. The user equipment positioning apparatus includes a receiver, a transmitter, and at least one processor. The receiver is configured to perform a message receiving operation performed by the user equipment positioning apparatus in the method according to any one of the first aspect or the implementations of the first aspect. The transmitter is configured to perform a message sending operation performed by the user equipment positioning apparatus in the method according to any one of the first aspect or the implementations of the first aspect. The at least one processor invokes instructions to perform a message processing operation performed by the user equipment positioning apparatus in the method according to the second aspect or any one of the second aspect.

According to an eighth aspect, a user equipment positioning apparatus is provided. The user equipment positioning apparatus has a function of implementing the second UE in the method examples in the third aspect. The function may be implemented by hardware, or may be implemented by hardware executing corresponding software. The hardware or the software includes one or more modules corresponding to the foregoing function. In a possible design, the user equipment positioning apparatus includes: a sending unit, configured to send a first registration request message to a second network element, where the first registration request includes identification information of the second UE and capability information of the second UE; and receive a third positioning request message sent by the second network element, where the third positioning request message indicates the second UE to determine relative location information between the second UE and first UE, and the third positioning request message includes identification information of the first UE.

According to a ninth aspect, a computer program product is provided. The computer program product includes computer program code. When the computer program code is run, the method performed by the first network element in the foregoing aspect is performed.

According to a tenth aspect, a computer program product is provided. The computer program product includes computer program code. When the computer program code is run, the method performed by the second network element in the foregoing aspect is performed.

According to an eleventh aspect, a computer program product is provided. The computer program product includes computer program code. When the computer program code is run, the method performed by the second UE in the foregoing aspect is performed.

According to a twelfth aspect, this application provides a chip system. The chip system includes at least one processor and a transceiver. The processor runs instructions to perform the method according to any one of the first aspect or the second aspect. The chip system may include a chip, or may include a chip and another discrete component.

According to a thirteenth aspect, this application further provides a user equipment positioning system, including the user equipment positioning apparatus according to any one of the fourth aspect and the user equipment positioning apparatus according to any one of the fifth aspect; or including the user equipment positioning apparatus according to any one of the sixth aspect and the user equipment positioning apparatus according to any one of the seventh aspect.

According to a fourteenth aspect, this application provides a computer-readable storage medium. The computer-readable storage medium stores a computer program. When the computer program is run, the method performed by the first network element in the foregoing aspect is implemented.

According to a fifteenth aspect, this application provides a computer-readable storage medium. The computer-readable storage medium stores a computer program. When the computer program is run, the method performed by the second network element in the foregoing aspect is implemented.

According to a sixteenth aspect, this application provides a computer-readable storage medium. The computer-readable storage medium stores a computer program. When the computer program is run, the method performed by the second UE in the foregoing aspect is implemented.

It should be understood that for beneficial effects achieved by technical solutions in the fourth aspect to the sixteenth aspect and the corresponding feasible implementations in embodiments of this application, refer to the foregoing technical effects in the first aspect, the second aspect, the third aspect, and the corresponding possible implementations. Details are not described herein again.

BRIEF DESCRIPTION OF DRAWINGS

FIG. 4A and FIG. 4B are a flowchart of a user equipment UE positioning method according to an embodiment of this application;

FIG. 6A and FIG. 6B are a flowchart of a user equipment UE positioning method according to an embodiment of this application;

DESCRIPTION OF EMBODIMENTS

To make objectives, technical solutions and advantages of embodiments of this application clearer, the following further describes embodiments of this application in detail with reference to the accompanying drawings.

First, it should be noted that the terms "system" and "network" may be used interchangeably in embodiments of this application, and "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "I" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, unless otherwise stated, ordinal numbers such as "first" and "second" in embodiments of this application are intended to distinguish between a plurality of objects, but are not intended to limit an order, a time sequence, a priority, or importance of the plurality of objects.

Figures 1A, 1B:
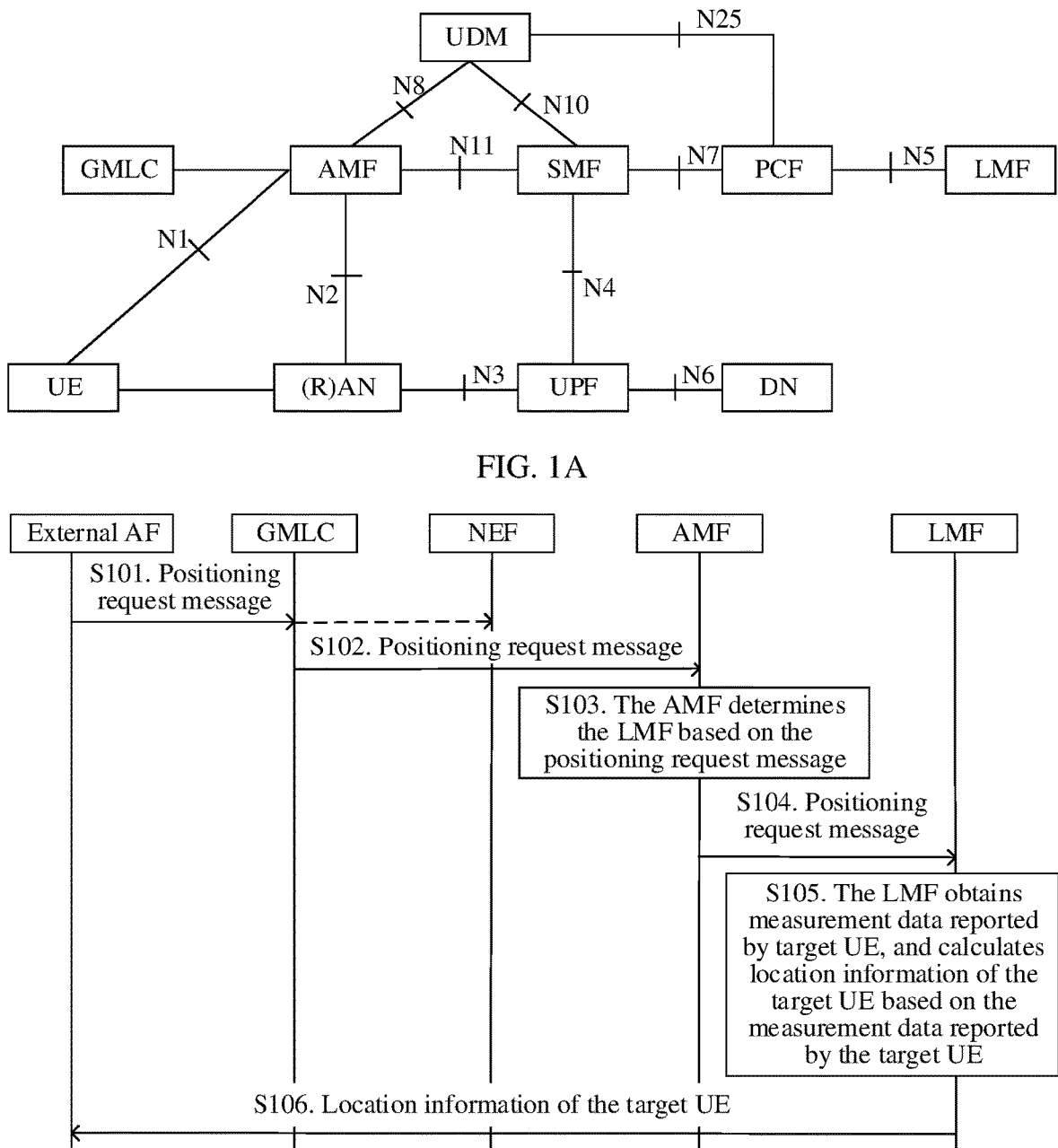
FIG. 1A is a schematic diagram of a 5G network architecture according to an embodiment of this application.
FIG. 1B is a flowchart of a user equipment UE positioning method according to an embodiment of this application.

FIG. 1A is a schematic diagram of a 5G network architecture according to an embodiment of this application. The 5G network architecture shown in FIG. 1A may include a (radio) access network ((R)AN) network element, user equipment (UE), a user plane function (UPF) network element, a data network (DN), an access and mobility management function (AMF) network element, a session management function (SMF) network element, a policy control function (PCF) network element, a unified data management (UDM) network element, a location management function (LMF) network element, a gateway mobile location center (GMLC), and the like.

The following briefly describes functions of network elements in this application.

A (R)AN is a device that provides a wireless communication function for a terminal device. To connect to a carrier network, the terminal device first connects to the (R)AN and then may be connected to a service node of the carrier network through the (R)AN. The (R)AN device in this application includes but is not limited to: a next generation base station (gNodeB, gNB) in 5G, an evolved NodeB (eNB), a radio network controller (radio network controller, RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, and the like. The (R)AN device in this application also includes a non-3GPP access device, for example, a wireless local area network (WLAN) access network or a fixed network access network.

The terminal device may also be referred to as UE, and is a device having a wireless transceiver function, and may be deployed on land, including an indoor or outdoor device, a handheld device, or a vehicle-mounted device, may be deployed on a water surface (for example, on a ship), or may be deployed in the air (for example, on a plane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use services such as data and/or voice provided by the carrier network. The terminal device may further access a DN through the carrier network, and use a carrier service deployed on the DN and/or a service provided by a third party. The third party may be a service provider other than the carrier network and the terminal device, and may provide other services such as data and/or voice for the terminal device. A specific representation form of the third party may be determined based on an actual application scenario, and is not limited herein.

The UPF network element is a gateway provided by a carrier, and is a gateway for communication between the carrier network and the DN. The UPF network element includes user plane-related functions such as data packet routing and transmission, packet detection, service usage reporting, quality of service (QoS) processing, lawful interception, uplink packet detection, and downlink data packet storage.

The DN may also be referred to as a packet data network (PDN), and is a network located outside the carrier network. The carrier network may access a plurality of DNs, and a plurality of services may be deployed on the DNs, to provide services such as data and/or a voice to the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company.

The AMF network element is a control plane network element provided by the operator network, and is responsible for access control and mobility management for accessing the operator network by the terminal device. For example, the access control and mobility management includes functions such as mobility status management, temporary user identity allocation, user authentication and authorization, user location update, user registration with a network, and user handover.

The SMF network element is a control plane network element provided by the carrier network, and is responsible for managing a protocol data unit (PDU) session of the terminal device. The PDU session is a channel used to transmit a PDU, and the terminal device transmits a PDU to the DN through the PDU session. The SMF network element is responsible for establishment, maintenance, deletion, and the like of the PDU session. The SMF network element includes session-related functions such as session management (for example, session establishment, modification, and release, including tunnel maintenance between the UPF and the AN), selection and control of the UPF network element, service and session continuity (SSC) mode selection, and roaming.

The PCF network element is a control plane function provided by the carrier, and is configured to provide a policy for a network element in a network. In an implementation, the policy may include an access control policy, a mobility management policy, a charging-related policy, a QoS-related policy, an authorization-related policy, and the like.

The UDM network element is a control plane network element provided by the carrier, and is responsible for storing information such as a subscription permanent identifier (SUPI), a credential, a security context, and subscription data of a subscriber in the carrier network. The information stored in the UDM network element may be used for authentication and authorization when the terminal device accesses the carrier network. The subscriber in the carrier network may be a user using a service provided by the carrier network, for example, a user using a SIM card of China Telecom, or a user using a SIM card of China Mobile. The subscription permanent identifier (SUPI) of the subscriber may be a number of the SIM card or the like. A credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the user. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document. Unless otherwise specified, the security context is used as an example for description in embodiments of this application. However, embodiments of this application are also applicable to authentication and/or authorization information described in another manner.

The LMF network element is mainly configured to manage a positioning request of a positioning service and allocate a positioning resource.

The GMLC network element is mainly configured to receive and process positioning requests from a positioning client and an application function, select an appropriate AMF for the positioning service, and return a location result to the positioning client and the application function.

Certainly, it may be understood that the network architecture shown in FIG. 1A may further include another network element, for example, an application function (AF) network element. The AF network element mainly provides an application layer service, and supports interacting with a 5G core network to provide a service, for example, a service that affects a data routing decision or a policy control function, or some third-party services provided for a network side.

It should be noted that, in the network architecture shown in FIG. 1A, N1, N2, N3, N4, N6, and the like are interface sequence numbers. For meanings of the interface sequence numbers, refer to meanings defined in a 3GPP standard protocol. This is not limited herein.

It should be noted that this application may also be applied to a 4th generation (4G) network architecture. For example, a mobility management entity (MME) in 4G provides a function of the access and mobility management function network element in this application. The MME and a serving gateway (serving gateway, SGW) in 4G provide a function of the session management function network element in this application. A packet data network gateway (PDN gateway, PGW) in 4G provides a function of the core network UPF in this application. A data analysis network element in 4G provides a function of a data analysis network element in this application. In addition, a form and a quantity of network elements shown in FIG. 1A are merely used as an example, and do not constitute a limitation on this application.

In a future communication system such as a 6G communication system, the network element or the device may still use a name of the network element or the device in the 4G or 5G communication system, or have another name A function of the network element or the device may be completed by one independent network element, or may be jointly completed by several network elements. This is not limited in embodiments of this application.

In actual deployment, the network elements may be co-deployed. For example, the access and mobility management function network element may be co-deployed with the session management function network element, and the session management function network element may be co-deployed with the user plane function network element. When two network elements are co-deployed, interaction between the two network elements provided in embodiments of this application becomes an internal operation of the co-deployed network elements or may be omitted.

FIG. 1B is a flowchart of a user equipment UE positioning method according to an embodiment of this application. Refer to FIG. 1B. The method includes the following steps.

S101. An external AF sends a positioning request message to a GMLC or an NEF.

The positioning request message may include identification information of target UE or positioning precision information. The positioning request message may be used to request to position the target UE. Correspondingly, the GMLC or the NEF receives the positioning request message sent by the external AF.

Certainly, it may be understood that the external AF may alternatively be a positioning client, or referred to as a location service (LCS) client, or the like. This is not limited in this application.

S102. The GMLC sends the positioning request message to an AMF.

S103. The AMF determines an LMF based on the positioning request message.

In this application, the AMF may select an LMF for the positioning request message based on the positioning precision information in the positioning request message, delay information, and the like. For example, different LMFs have different positioning capabilities (for example, support or do not support low-delay positioning). The AMF may query a local configuration for an available LMF, or may query a network server for an available LMF, and then determine, based on a capability of the LMF and a delay requirement in the positioning request message, an LMF that serves a current positioning request.

S104. The AMF sends the positioning request message to the LMF.

Correspondingly, the LMF receives the positioning request message sent by the AMF. The LMF may select a positioning method based on the received positioning request message, for example, an observed time difference of arrival (OTDOA), a global navigation satellite system (GNSS), wireless fidelity (Wi-Fi), or Bluetooth (BT).

The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In addition, when selecting the positioning method, the LMF may select one or more positioning methods. This is not limited in this application.

S102 to S104 may also be referred to as that the GMLC sends a first positioning request message to the LMF.

S105. The LMF obtains measurement data reported by the target UE, and calculates location information of the target UE based on the measurement data reported by the target UE.

In a possible implementation, after the LMF selects the positioning method, the LMF may send a notification message to the target UE. The notification message may notify the target UE to collect, based on the positioning method selected by the LMF, corresponding measurement data.

Correspondingly, after receiving the notification message sent by the LMF, the target UE may collect the measurement data based on the notification message, and then report the collected measurement data to the LMF, so that the LMF calculates the location information of the target UE based on the measurement data.

S106. The LMF feeds back the location information of the target UE to the external AF.

After calculating the location information of the target UE, the LMF may feed back the calculated location information of the target UE to the external AF.

In the positioning method according to the embodiment shown in FIG. 1B, once the target UE is located indoors, when the target UE is positioned, a measurement signal collected by the target UE may be weak due to problems such as blocking of a building or a network coverage dead angle. That is, measurement data collected by the target UE from a surrounding base station may be inaccurate. In this case, precision of the location information of the target UE that is calculated by the LMF may be low.

In view of this, an embodiment of this application provides a new UE positioning method. In the positioning method, another UE that is not blocked by a building with the target UE may be used to assist in positioning the target UE, so that the location information of the target UE is calculated through location information of the another UE. This can improve precision of the calculated location information of the target UE.

The following describes in detail a user equipment UE positioning method according to an embodiment of this application.

Before the method in this application is described, an application scenario in this application is first further described, to facilitate understanding of this solution.

Figure 2:
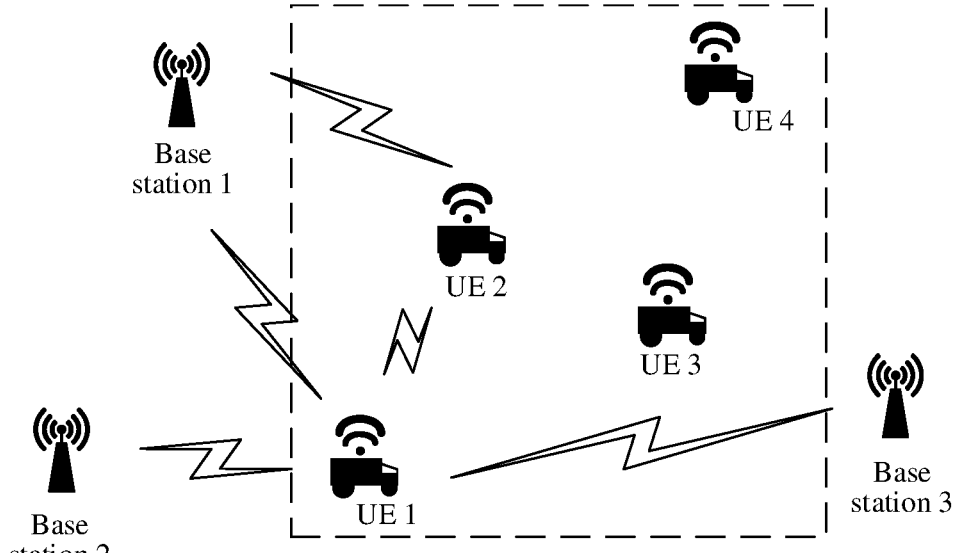
FIG. 2 is a schematic diagram of an application scenario according to an embodiment of this application.

FIG. 2 is a schematic diagram of an application scenario according to an embodiment of this application. Refer to FIG. 2. The application scenario may include a plurality of UEs and a plurality of base stations. In FIG. 2, an example in which there are three base stations and four UEs is used for illustration. It is assumed that a dashed box shown in the figure represents a range of an indoor factory, UE 1 is target UE, that is, to-be-positioned UE, UE 2 is UE at a fixed location, and UE 3 and UE 4 are other UEs in the factory.

For example, the UE 2 may be a fixed mechanical arm in the factory, a fixed forklift in a moving range, or the like, and a radar device used for communication may be deployed on the UE 2. The UE 3 and the UE 4 may be fixed terminals, or may be mobile terminals. This is not limited in this application.

In the scenario shown in FIG. 2 in this application, a measurement signal may be sent and received between the UE 1 and the UE 2 through the radar device, and the UE 1 may obtain measurement data from a base station 1, a base station 2, and a base station 3. Then, the UE 1 or the UE 2 calculates a relative location between the UE 2 and the UE 1 by using a location of the UE 2 and the measurement data obtained by the UE 1. Further, a core network (an LMF or an AMF) calculates a location of the UE 1 by using the relative location and the location of the UE 2. In this way, the UE 2 is used to position the UE 1, to improve accuracy of positioning UE.

For ease of description, in the following, the to-be-positioned UE is denoted as "target UE" or "first UE", and another fixed terminal device that is not blocked by a building with the target UE is denoted as Help UE or "second UE". It may be understood that, the first UE may be understood as the UE 1 in the embodiment shown in FIG. 2, and the Help UE may be understood as the UE 2 in the embodiment shown in FIG. 2.

Figure 3:
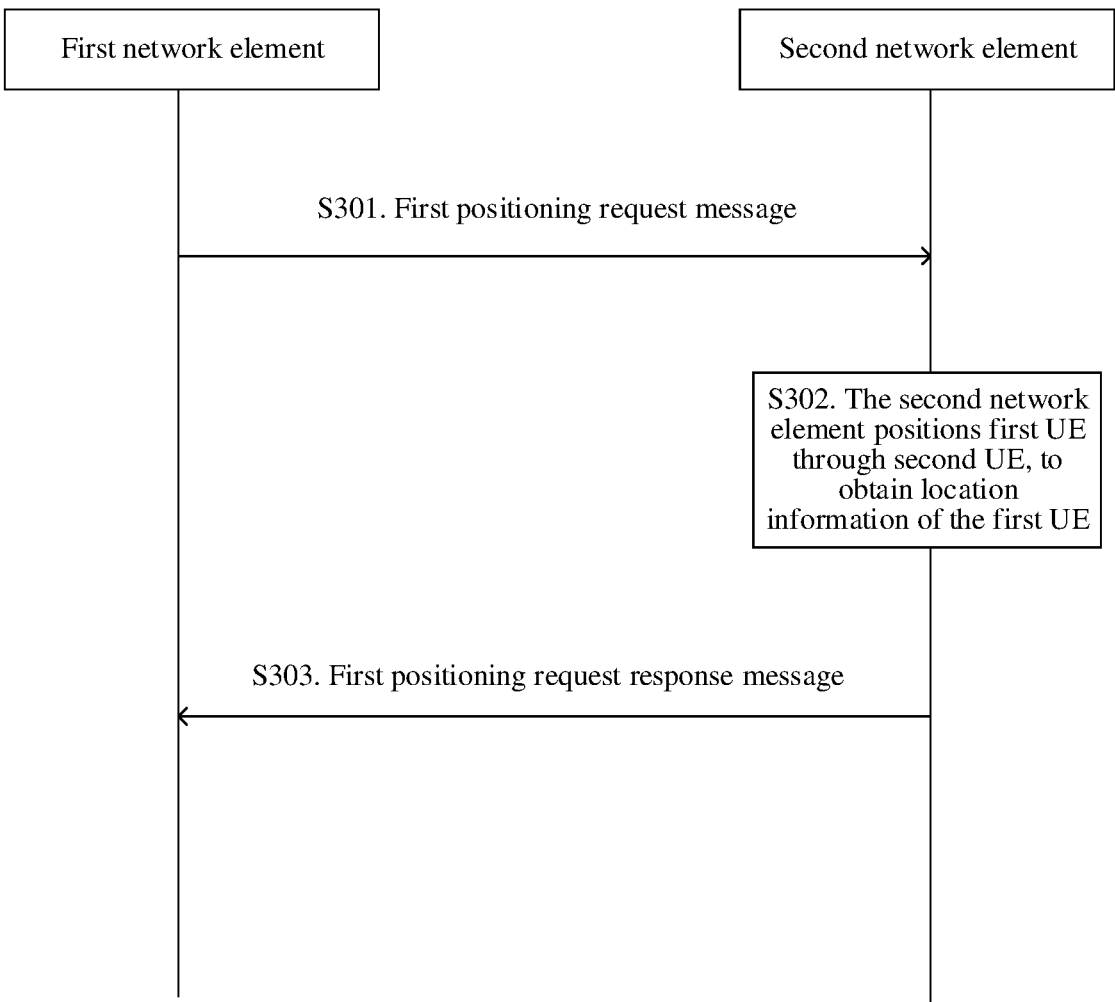
FIG. 3 is a flowchart of a user equipment UE positioning method according to an embodiment of this application.

FIG. 3 is a flowchart of a user equipment UE positioning method according to an embodiment of this application. As shown in FIG. 3, the method may include the following steps.

S301. A first network element sends a first positioning request message to a second network element.

The first positioning request message indicates the second network element to position first UE through second UE.

S302. The second network element positions the first UE through the second UE, to obtain location information of the first UE.

Correspondingly, the second network element receives the first positioning request message sent by the first network element, and positions the first UE by using the second UE based on the first positioning request message, to obtain the location information of the first UE.

S303. The second network element sends a first positioning request response message to the first network element.

The first positioning request response message includes the location information of the first UE.

In the positioning method in the embodiment shown in FIG. 3, the first network element may send a positioning request message to the second network element, to indicate the second network element to position target UE through auxiliary UE. Compared with the conventional technology in which the second network element directly positions the target UE, this method has higher accuracy of location information of the target UE, that is, can improve accuracy of positioning the target UE.

The following describes the steps in the embodiment shown in FIG. 3 in detail with reference to some embodiments.

It should be noted that in embodiments of this application, an example in which a first network element is a GMLC and a second network element is an LMF or an AMF is used for description.

Figure 4B:
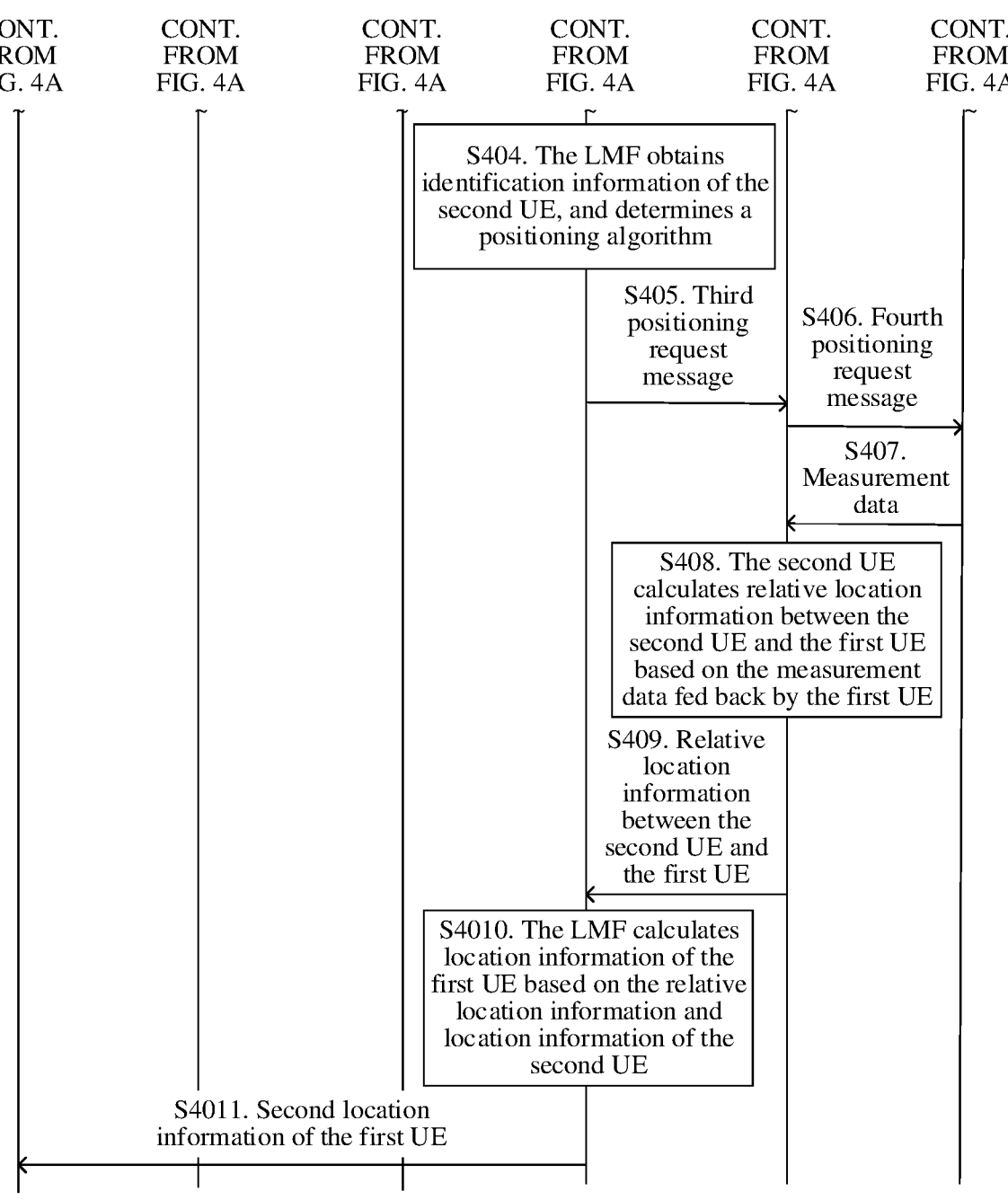

The following first uses an example in which the first network element is the GMLC and the second network element is the LMF for description. FIG. 4A and FIG. 4B are a flowchart of a user equipment UE positioning method according to an embodiment of this application. Refer to FIG. 4A and FIG. 4B. The method includes the following steps.

S401. An external AF sends a first positioning request message to a core network, to position location information of target UE.

Step S401 may include steps S101 to S105 in the embodiment shown in FIG. 1B. Therefore, for a specific implementation process of this step, refer to related descriptions in the embodiment shown in FIG. 1B. Details are not described herein again.

S402. An LMF sends first location indication information of first UE to a GMLC. Correspondingly, the GMLC receives the first location indication information of the first UE that is sent by the LMF.

It may be understood that the location information of the target UE obtained in step S401 is location indication information of the target UE calculated by the LMF based on a solution in the conventional technology. For ease of description, the information may be denoted as the "first location indication information".

The first location indication information may indicate first location information of the first UE, or may indicate that precision information of a first location of the first UE does not meet positioning precision information.

It should be noted that, in step S402, the LMF may send the first location indication information of the first UE to an AMF, and the AMF forwards the first location indication information of the first UE to the GMLC.

S403. The GMLC sends a second positioning request message to the LMF. Correspondingly, the LMF receives the second positioning request message sent by the GMLC.

The second positioning request message herein indicates the LMF to position the first UE through second UE. In other words, when positioning the first UE, the LMF may use the second UE to perform auxiliary positioning.

The second positioning request message may include at least one of the following information: identification information of the first UE, identification information of the second UE, and the positioning precision information. The positioning precision information may indicate a precision range of location information of the first UE. The identification information of the second UE may be an identity of the second UE, or may be location information of the second UE, or the like.

In a possible implementation, the GMLC may send the second positioning request message to the LMF through the AMF. In other words, step S403 may include: The GMLC sends the second positioning request message to the AMF, and then the AMF may forward the second positioning request message to the LMF.

In this embodiment of this application, the GMLC may send the second positioning request message to the LMF based on the first location indication information in step S402. In some embodiments, the following cases may be included.

Case 1: The GMLC determines that accuracy of first location information of the target UE does not meet the positioning precision information.

After the GMLC receives the first location information of the first UE that is sent by the LMF, the GMLC may determine, based on the positioning precision information in the first positioning request message, whether precision of the first location information reaches a preset precision range. If the precision of the first location information is not within the preset precision range, it indicates that the accuracy of the first location information is low. If the precision of the first location information is within the preset precision range, it indicates that the accuracy of the first location information is high.

It may be understood that the positioning precision information included in the second positioning request message is the preset precision range.

Case 2: The LMF determines that accuracy of first location information of the target UE does not meet the positioning precision information.

After the LMF calculates the first location information of the target UE, the LMF may determine, based on the positioning precision information included in the first positioning request message, whether precision of the first location information of the target UE reaches a preset precision range. If the precision of the first location information is not within the preset precision range, it indicates that the accuracy of the first location information calculated by the LMF is low. If the precision of the first location information is within the preset precision range, it indicates that the accuracy of the first location information calculated by the LMF is high.

When the LMF determines that the accuracy of the first location information of the target UE is low, the first location indication information may include information indicating that precision information of the first location information does not meet positioning precision. After receiving the first location indication information, the GMLC may send the second positioning request message to the LMF.

Through S403, a first network element sends the first positioning request message in S301 to a second network element.

S404. The LMF obtains the identification information of the second UE, and determines a positioning algorithm.

In this embodiment of this application, the LMF may obtain the identification information of the second UE in the following several manners. Details are as follows:

In a first manner, the LMF may obtain the identification information of the second UE from the AMF.

In this manner, the AMF selects the second UE, and then the LMF obtains the identification information of the second UE from the AMF. In some embodiments, the AMF may select the second UE based on the first location information of the target UE, for example, may select second UE close to the target UE.

In a second manner, the LMF may obtain the identification information of the second UE from the GMLC.

In a third manner, the LMF may obtain the identification information of the second UE based on registration information of the second UE.

It should be noted that, if the second positioning request message in S403 includes the identification information of the second UE, the LMF may obtain the identification information of the second UE from the GMLC; or if the second positioning request message does not include the identification information of the second UE, the LMF may obtain the identification information of the second UE from the AMF or the registration information of the second UE.

It may be understood that if the GMLC first sends the second positioning request message to the AMF, and the AMF forwards the second positioning request message to the LMF, the AMF may include the identification information of the second UE in the second positioning request message when forwarding the message. In this way, the LMF may obtain the identification information of the second UE from the AMF.

The registration information of the second UE may include location information, capability information, the identification information, and the like of the second UE. For example, the second UE may report a terminal type (for example, the terminal type of the second UE is a terminal that supports relative positioning calculation) of the second UE and a relative positioning coverage range of the second UE, and indicate that the second UE has a positioning calculation function in a registration process. The registration information may also be referred to as subscription data, and may be stored in a UDM, a user data repository (UDR), or another database. It should be understood that the capability information of the second UE may be understood as that the second UE supports relative positioning calculation and has the positioning calculation function.

In a possible implementation, the second UE may send a registration request message to the second network element, and receive a third positioning request message sent by the second network element. The first registration request may include the identification information of the second UE and the capability information of the second UE. The third positioning request message indicates the second UE to determine relative location information between the second UE and the first UE. The third positioning request message includes the identification information of the first UE.

For example, the second UE may send the registration request message (such as a first registration request message) to the LMF or the AMF. For specific function implementation of the third positioning request message, refer to detailed descriptions in the following embodiments. Details are not described herein.

For example, the LMF may select, based on the location information reported by the second UE in the registration process and the location information of the first UE that is calculated by the LMF in step S402, the second UE close to the first UE.

In another example, the LMF may select a fixed device near the first UE as the second UE. Information about the second UE may be configured in the LMF.

In some embodiments, the LMF may determine the positioning algorithm in the following several manners.

Method 1: Determining the positioning algorithm based on UE capability For example, if the UE capability is supporting Wi-Fi positioning but not supporting Bluetooth positioning, the LMF may select a Wi-Fi positioning algorithm.

Method 2: Determining the positioning algorithm based on positioning precision For example, it is assumed that UE supports all positioning methods, but a positioning precision requirement is high. In this case, the LMF may select a positioning algorithm through which high-precision location information can be obtained.

Certainly, it may be understood that the LMF may alternatively determine the positioning algorithm in another manner. For example, the LMF may alternatively determine the positioning algorithm based on a delay requirement, or may determine the positioning algorithm based on positioning precision and a delay requirement. This is not limited in this application.

S405. The LMF sends the third positioning request message to the second UE.

The third positioning request message herein indicates the second UE to determine the relative location information between the second UE and the first UE. The third positioning request message may include the identification information of the first UE.

Optionally, the third positioning request message may further include the positioning algorithm determined by the LMF in step S404.

Correspondingly, the second UE may receive the third positioning request message sent by the AMF, and send the positioning request message to the first UE based on the identification information of the first UE that is included in the third positioning request message.

S406. The second UE sends a fourth positioning request message to the first UE. Correspondingly, the first UE receives the fourth positioning request message sent by the second UE.

The fourth positioning request message may include the positioning algorithm determined by the LMF in step S404. The fourth positioning request message may indicate the first UE to collect measurement data based on the positioning algorithm. That is, different positioning algorithms require different measurement data.

For example, it is assumed that a downlink positioning method, for example, an OTDOA, is selected for the algorithm. In this case, the measurement data collected by the first UE may be a positioning reference signal (PRS) sent by the second UE. Certainly, the first UE may collect a plurality of PRS signals within specified time, and then calculate an average value of the plurality of PRS signals, and the like. This is not limited in this application.

It should be noted that, when an uplink time difference of arrival (UTDOA), a GNSS, or a combination of a plurality of algorithms is selected for the algorithm, data that is to be measured may alternatively be strength of a radio signal sent by the second UE.

Optionally, the data that is to be measured may further include a transmit angle, transmit power, and the like of the radio signal. This is not limited in this application.

S407. The first UE feeds back the measurement data to the second UE.

After receiving the fourth positioning request message sent by the second UE, the first UE may collect corresponding measurement data based on the positioning algorithm included in the fourth positioning request message, and then feed back the measurement data to the second UE.

S408. The second UE calculates a relative location between the second UE and the first UE based on the measurement data fed back by the first UE.

The relative location may include a relative distance between the second UE and the first UE and a relative angle between the first UE and the second UE.

For example, if the measurement data collected by the first UE is signal strength sent by the second UE, after collecting the signal strength, the first UE may report the collected measurement data to the second UE. Correspondingly, after receiving the measurement data, the second UE may calculate the relative location between the second UE and the first UE based on the measurement data.

In this embodiment of this application, a correspondence between signal strength and a distance between two UEs may be defined, and then the distance between the two UEs is determined based on the collected signal strength. For example, it is assumed that the correspondence between the signal strength and the distance between the two UEs is as follows:

For example, when the signal strength is 3 db, it indicates that the distance between the two UEs is 10 m; and when the signal strength is 5 db, it indicates that the distance between the two UEs is 20 m.

S409. The second UE sends the relative location information between the second UE and the first UE to the LMF.

S4010. The LMF calculates the location information of the first UE based on the relative location information and the location information of the second UE.

In a possible implementation, the LMF may calculate the location information of the first UE based on a relative location sent by the second UE in S409 and the location information of the second UE.

The location information of the second UE may be determined based on the identification information of the second UE. It can be learned from the foregoing steps that the LMF may obtain the identification information of the second UE in step S404, and further send the positioning request message to the second UE. Therefore, the LMF may determine the location information of the second UE based on the identification information of the second UE in S409.

It is assumed that a correspondence between identification information of UE and location information of the UE is as follows: When the identification information is 1, the location information of the UE is (A1, B1), and when the identification information is 2, the location information of the UE is (A2, B2). It is assumed that the identification information of the second UE in S409 is 2, and the location information of the second UE is (A2, B2).

Figure 5:
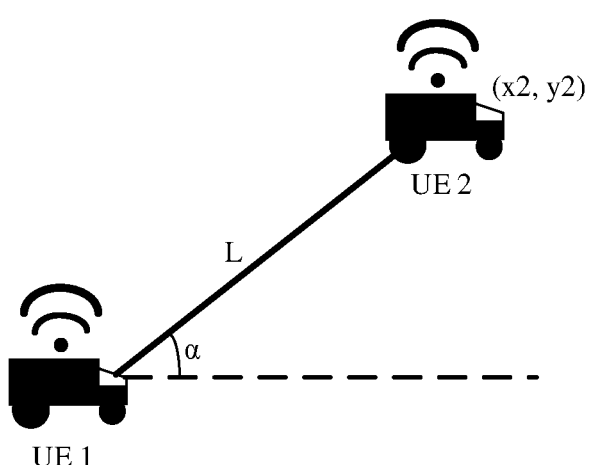
FIG. 5 is a schematic diagram of a location relationship of UE according to an embodiment of this application.

For example, refer to FIG. 5. It is assumed that the first UE is UE 1, the second UE is UE 2, a relative distance between the UE 1 and the UE 2 that is calculated by the LMF is L, a relative angle between the UE 1 and the UE 2 is α, and location information of the UE 2 is (x2, y2). In this case, location information of the UE 1 may be obtained through calculation based on the foregoing known information.

The second network element positions the first UE by using the second UE through S404 to S4010, to obtain the location information of the first UE.

S4011. The LMF sends a positioning request response message to the external AF.

The positioning request response message includes the location information of the first UE in S4010. For ease of description, the location information of the first UE located through the second UE may be denoted as "second location information". In other words, the LMF may send the second location information of the first UE to the external AF.

In step S4011, the LMF may send the positioning request response message (that is, a response message of the second positioning request message initiated by the GMLC) to the GMLC, and then the GMLC forwards the positioning request response message to the external AF.

It may be understood that, compared with the first location information, the second location information is more accurate and more precise.

It should be noted that, in step S408, the second UE may alternatively send the relative location between the second UE and the first UE to the AMF, and then in step S409, the AMF may calculate the location information of the first UE based on the relative location and the location information of the second UE.

In the positioning method in the embodiment shown in FIG. 4A and FIG. 4B, the GMLC may send the positioning request message to the LMF, to indicate the LMF to position the target UE through the auxiliary UE, and then the LMF may send the request message to the target UE, to indicate the target UE to calculate a relative location between the target UE and the auxiliary UE, so that the target UE sends the relative location to the LMF, and the LMF calculates location information of the target UE. According to the foregoing method, the core network (the LMF) may obtain the high-precision location information of the target UE by using relative location information calculated by the auxiliary UE, to improve accuracy of positioning the target UE.

Figure 6A:
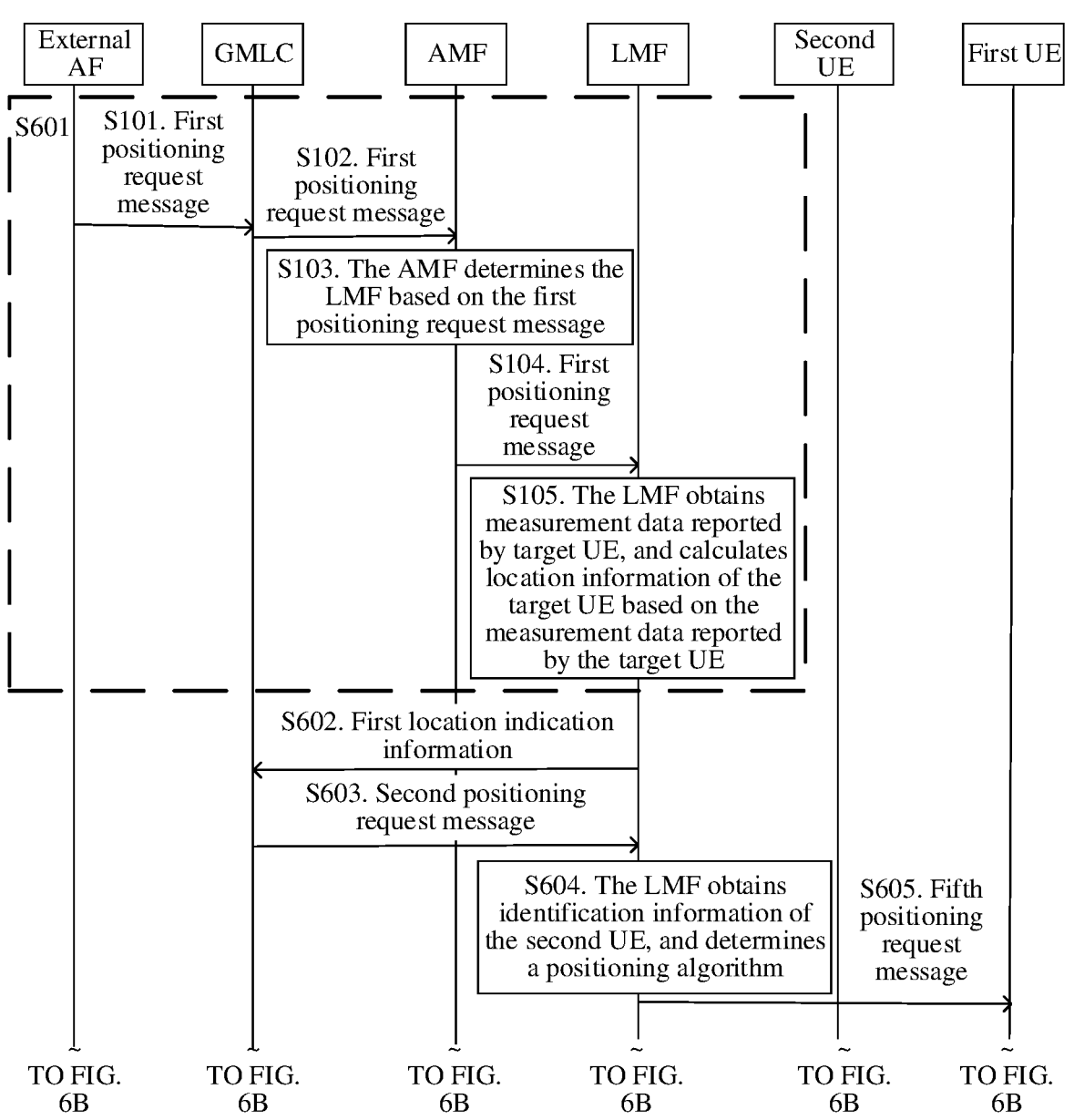

FIG. 6A and FIG. 6B are a flowchart of a user equipment UE positioning method according to an embodiment of this application. Refer to FIG. 6A and FIG. 6B. The method includes the following steps.

S601. An external AF sends a first positioning request message to a core network, to position location information of target UE.

Step S601 may include steps S101 to S105 in the embodiment shown in FIG. 1B. Therefore, for a specific implementation process of this step, refer to related descriptions in the embodiment shown in FIG. 1B. Details are not described herein again.

S602. An LMF sends first location indication information of first UE to a GMLC. Correspondingly, the GMLC receives the first location indication information of the first UE that is sent by the LMF.

It may be understood that the location information of the target UE obtained in step S601 is location indication information of the target UE calculated by the LMF based on a solution in the conventional technology. For ease of description, the location information may be denoted as the "first location indication information".

It should be noted that, in step S602, the LMF may send the first location indication information to an AMF, and the AMF forwards the first location indication information to the GMLC.

S603. The GMLC sends a second positioning request message to the LMF.

S604. The LMF obtains identification information of the second UE, and determines a positioning algorithm.

It may be understood that, for step S602, step S603, and step S604, refer to descriptions of step S402, step S403, and step S404 in the embodiment shown in FIG. 4A and FIG. 4B. Details are not described herein again.

S605. The LMF sends a fifth positioning request message to the first UE.

The fifth positioning request message indicates the first UE to calculate relative location information between the first UE and the second UE.

In some embodiments, the fifth positioning request message may include the identification information of the second UE. In other words, after performing step S604, the LMF may notify the first UE of a selected UE identifier (that is, the identification information of the second UE), so that the first UE can find corresponding UE based on the UE identifier.

Optionally, the fifth positioning request message may further include the positioning algorithm determined by the LMF in step S604.

S606. The first UE sends a sixth positioning request message to the second UE. Correspondingly, the second UE receives the sixth positioning request message sent by the first UE.

Optionally, the sixth positioning request message includes the positioning algorithm determined by the LMF in step S604. The sixth positioning request message indicates the second UE to collect corresponding measurement data based on the determined positioning algorithm.

S5607. The second UE feeds back the measurement data to the first UE.

After receiving the sixth positioning request message, the second UE may collect the measurement data corresponding to the positioning algorithm, and then feed back the measurement data to the first UE, so that the first UE calculates a relative location between the first UE and the second UE.

S608. The first UE calculates the relative location between the first UE and the second UE based on the measurement data fed back by the second UE.

For example, if the measurement data collected by the second UE is signal strength of the second UE and signal strength of a surrounding base station, after collecting the signal strength of the second UE and the signal strength of the surrounding base station, the second UE may report the collected measurement data to the first UE. Correspondingly, after receiving the measurement data, the first UE may calculate the relative location between the first UE and the second UE based on the measurement data.

In this embodiment of this application, a distance between two UEs corresponding to the measurement data (that is, the signal strength) may be determined based on a preset correspondence between signal strength and a distance between two UEs. For details, refer to the descriptions of step S408 in the embodiment shown in FIG. 4A and FIG. 4B. Details are not described herein again.

S609. The first UE sends the relative location information between the first UE and the first UE to the LMF.

S6010. The LMF calculates location information of the first UE based on the relative location information and location information of the second UE.

The second network element positions the first UE by using the second UE through S604 to S6010, to obtain location information of the first UE.

S6011. The LMF sends a positioning request response message to the external AF.

It should be noted that, the LMF may send the positioning request response message (that is, a response message of the second positioning request message initiated by the GMLC) to the GMLC, and then the GMLC forwards the positioning request response message to the external AF.

It may be understood that, for step S6010 and step S6011, refer to descriptions of step S4010 and step S4011 in the embodiment shown in FIG. 4A and FIG. 4B. Details are not described herein again.

In the positioning method in the embodiment shown in FIG. 6A and FIG. 6B, the GMLC may send the positioning request message to the LMF, to indicate the LMF to position the target UE through auxiliary UE, and then the LMF may send the request message to the target UE, to indicate the target UE to calculate a relative location between the target UE and the auxiliary UE, so that the target UE sends the relative location to the LMF, and the LMF calculates location information of the target UE. According to the foregoing method, the target UE may obtain the relative location between the target UE and the auxiliary UE through calculation by using a precision location of the auxiliary UE, so that the location information of the target UE calculated by the LMF is more accurate.

The following uses an example in which the first network element is the GMLC and the second network element is the AMF for description.

Figure 7A:
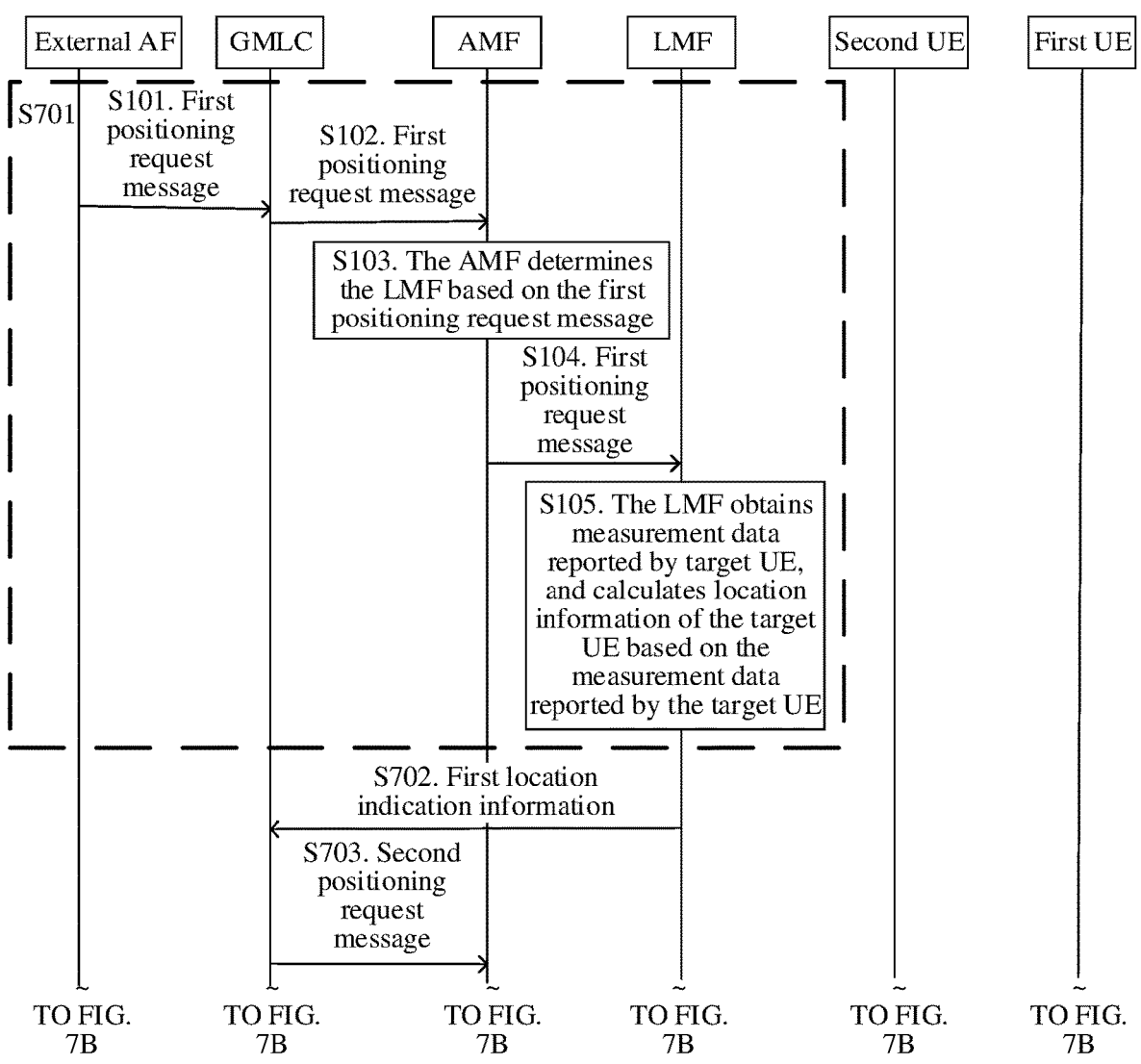
FIG. 7A and FIG. 7B are a flowchart of a user equipment UE positioning method according to an embodiment of this application.
Figure 7B:
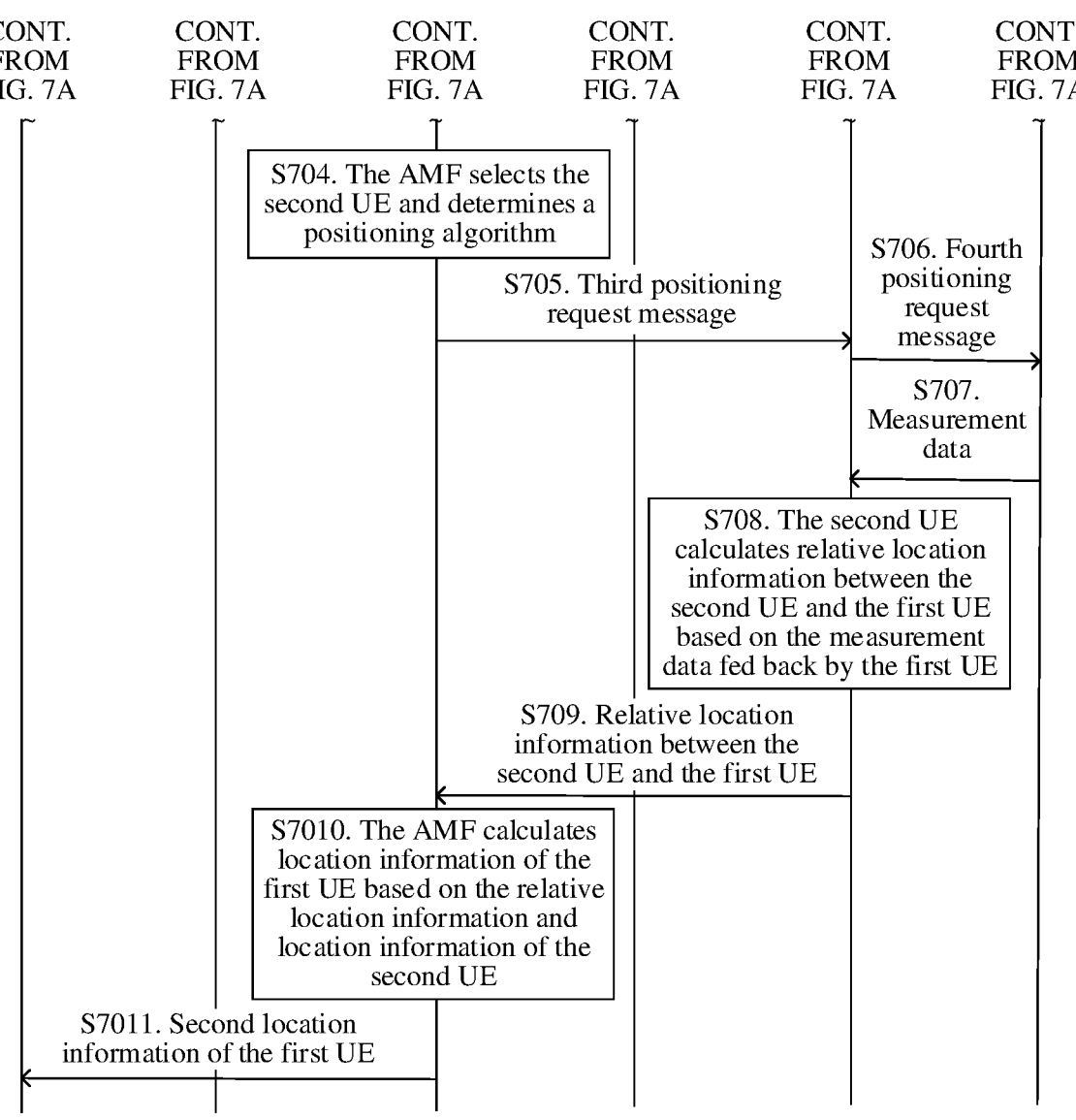

FIG. 7A and FIG. 7B are a flowchart of still another user equipment UE positioning method according to an embodiment of this application. Refer to FIG. 7A and FIG. 7B. The method may include the following steps.

S701. An external AF sends a first positioning request message to a core network, to position location information of target UE.

Step S701 may include steps S101 to S105 in the embodiment shown in FIG. 1B. Therefore, for a specific implementation process of this step, refer to related descriptions in the embodiment shown in FIG. 1B. Details are not described herein again. S702. An LMF sends first location indication information of first UE to a GMLC. Correspondingly, the GMLC receives the first location indication information of the first UE that is sent by the LMF.

It should be noted that, the LMF may send the first location indication information of the first UE to an AMF, and the AMF forwards the first location indication information of the first UE to the GMLC.

S703. The GMLC sends a second positioning request message to the AMF.

S704. The AMF selects second UE, and determines a positioning algorithm.

S705. The AMF sends a third positioning request message to the second UE.

In a possible implementation, the AMF may send the third positioning request message to the second UE. The third positioning request message may include identification information of the first UE and identification information of the second UE. The third positioning request message may indicate the second UE to determine relative location information between the second UE and the first UE.

S706. The second UE sends a fourth positioning request message to the first UE. Correspondingly, the first UE receives the fourth positioning request message sent by the second UE.

The fourth positioning request message may indicate the first UE to collect measurement data based on the positioning algorithm.

S707. The first UE feeds back the measurement data to the second UE.

S708. The second UE calculates the relative location information between the second UE and the first UE based on the measurement data fed back by the first UE.

S709. The second UE sends the relative location information between the second UE and the first UE to the AMF.

S7010. The AMF calculates location information of the first UE based on the relative location information and location information of the second UE.

S7011. The AMF sends a positioning request response message to the external AF.

In step S7011, the AMF may send the positioning request response message (that is, a response message of the second positioning request message initiated by the GMLC) to the GMLC, and then the GMLC forwards the positioning request response message to the external AF.

It should be noted that the AMF in the embodiment shown in FIG. 7A and FIG. 7B performs the method performed by the LMF in the embodiment shown in FIG. 4A and FIG. 4B. For steps S701 to S703 and S706 to S7011 in the embodiment shown in FIG. 7A and FIG. 7B, refer to descriptions of steps S401 to S403 and S406 to S4011 in the embodiment shown in FIG. 4A and FIG. 4B. Details are not described herein again.

A difference between the embodiment shown in FIG. 7A and FIG. 7B and the embodiment shown in FIG. 4A and FIG. 4B includes that in the embodiment shown in FIG. 4A and FIG. 4B the LMF determines the second UE, and the LMF sends the third positioning request message to the second UE, but in the embodiment shown in FIG. 7A and FIG. 7B, the AMF determines the second UE, and the AMF sends the third positioning request message to the second UE. For specific implementation of step S704 in the embodiment shown in FIG. 7A and FIG. 7B, refer to step S404 in the embodiment shown in FIG. 4A and FIG. 4B. Details are not described herein again.

It may be understood that after step S704 is performed, the AMF may alternatively forward the selected second UE and the determined positioning algorithm to the LMF, and the LMF sends the third positioning request message to the second UE. Alternatively, after step S703, the AMF may forward, to the LMF, the second positioning request message sent by the GMLC, and the LMF determines the identification information of the second UE. In S705, the LMF sends the third positioning request message to the second UE.

In the positioning method in the embodiment shown in FIG. 7A and FIG. 7B, the GMLC may send a positioning request message to the AMF, to indicate the AMF to position the target UE through auxiliary UE, and then the AMF may send a request message to the auxiliary UE, to indicate the auxiliary UE to calculate a relative location between the auxiliary UE and the target UE, so that the auxiliary UE sends the relative location to the AMF, and the AMF calculates location information of the target UE. According to the foregoing method, the AMF may calculate the location information of the target UE based on location information of the auxiliary UE and the relative location calculated by the auxiliary UE. A method for calculating the location information of the target UE through the auxiliary UE can avoid a problem that the calculated location information of the target UE is inaccurate due to problems such as blocking of a building or a network dead angle, and improve accuracy of positioning the target UE.

Figure 8A:
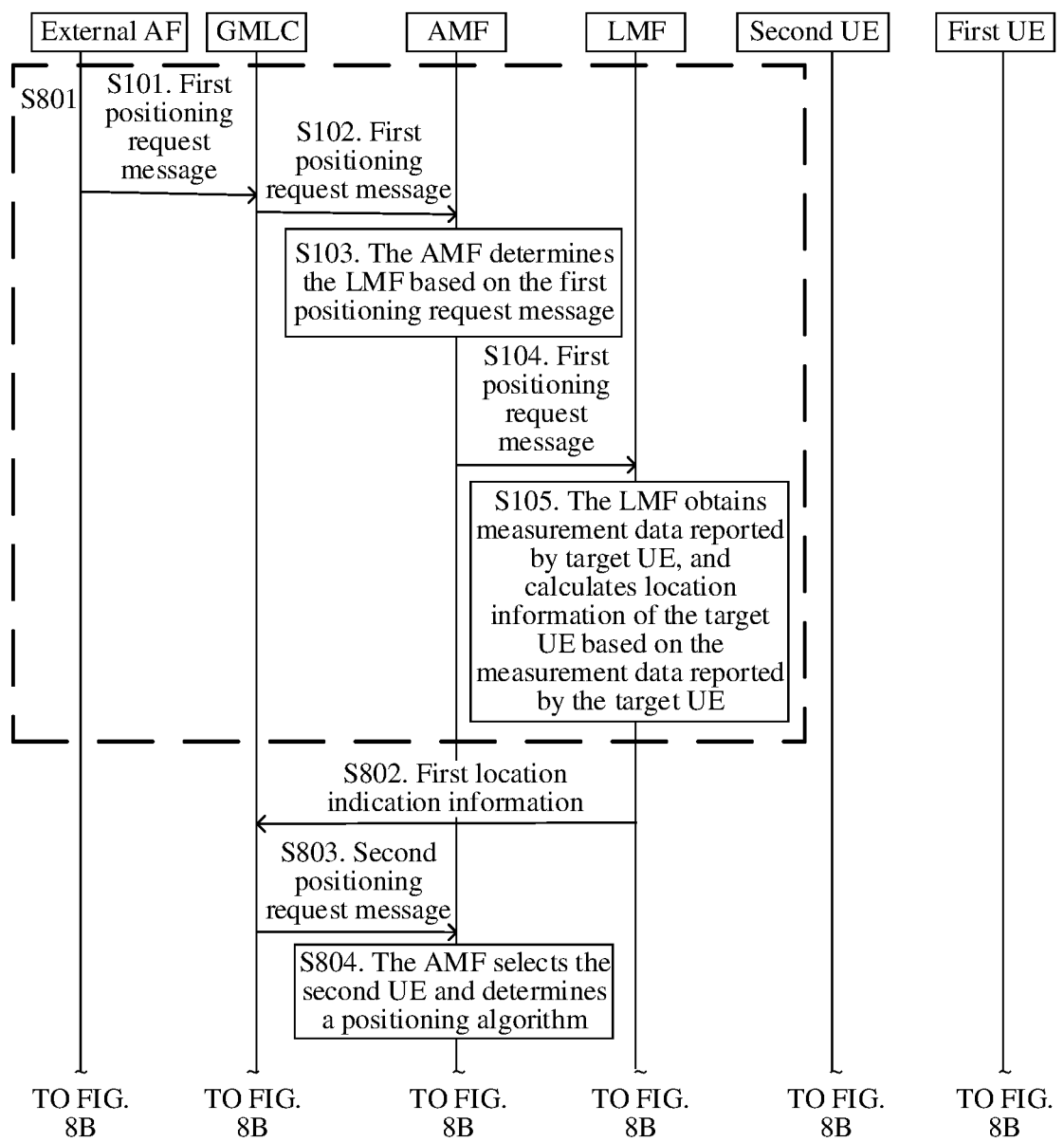
FIG. 8A and FIG. 8B are a flowchart of a user equipment UE positioning method according to an embodiment of this application.
Figure 8B:
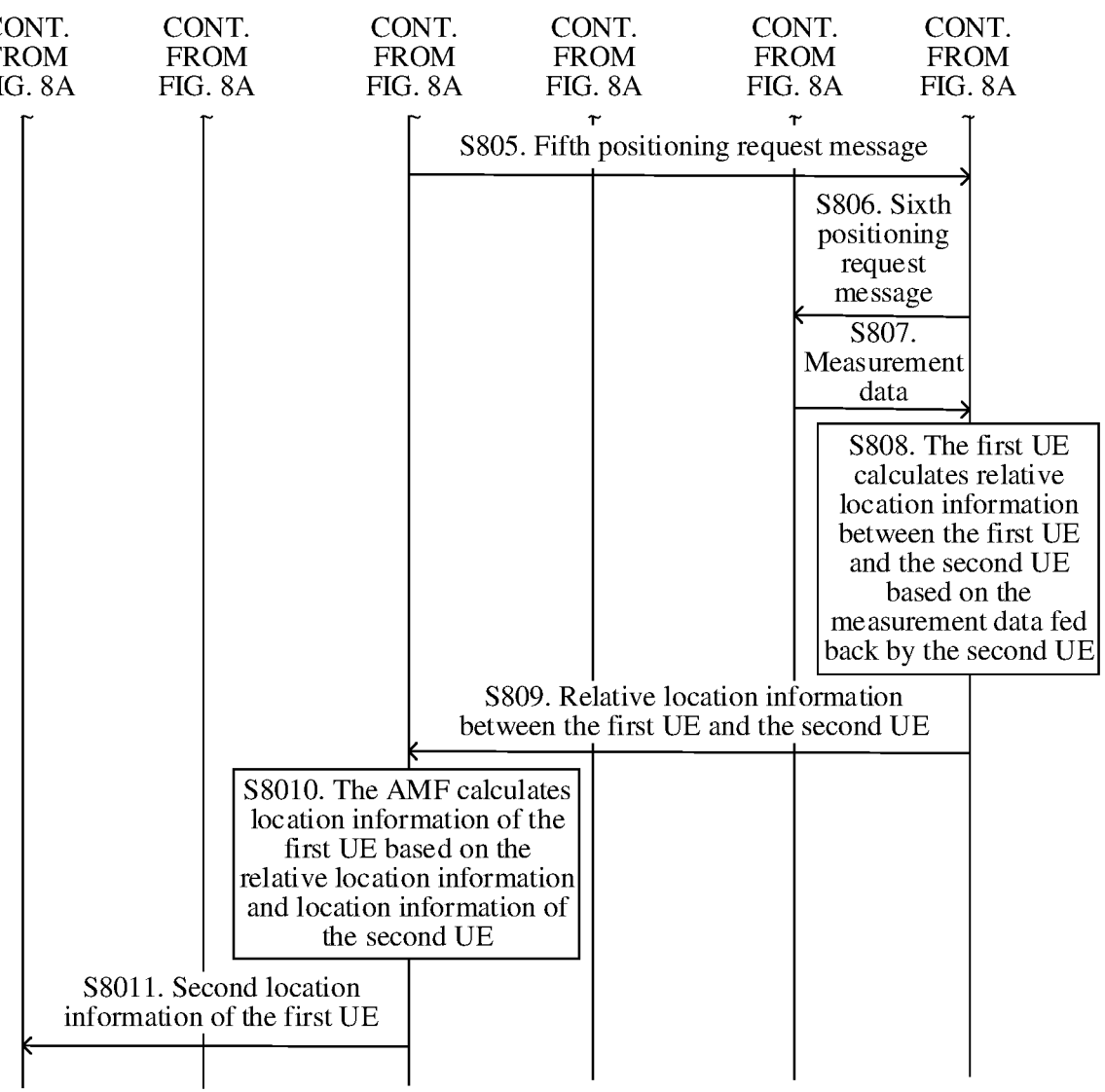

FIG. 8A and FIG. 8B are a flowchart of still another user equipment UE positioning method according to an embodiment of this application. Refer to FIG. 8A and FIG. 8B. The method may include the following steps.

S801. An external AF sends a first positioning request message to a core network, to position location information of target UE.

S802. An LMF sends first location indication information of first UE to a GMLC. Correspondingly, the GMLC receives the first location indication information of the first UE that is sent by the LMF.

In step S802, the LMF may send the first location indication information of the first UE to an AMF, and then the AMF sends the first location indication information of the first UE to the GMLC.

S803. The GMLC sends a second positioning request message to the AMF.

S804. The AMF selects second UE, and determines a positioning algorithm.

S805. The AMF sends a fifth positioning request message to the first UE.

In a possible implementation, the AMF may send a fifth positioning request message to the first UE. The fifth positioning request message may include identification information of the first UE and identification information of the second UE. The fifth positioning request message may indicate the first UE to determine relative location information between the first UE and the first UE.

S806. The first UE sends a sixth positioning request message to the second UE. Correspondingly, the second UE receives the sixth positioning request message sent by the first UE.

The sixth positioning request message may indicate the second UE to collect corresponding measurement data based on the positioning algorithm.

S807. The second UE feeds back the measurement data to the first UE.

S808. The first UE calculates the relative location information between the first UE and the second UE based on the measurement data fed back by the second UE.

S809. The first UE sends the relative location information between the first UE and the second UE to the AMF.

S8010. The AMF calculates location information of the first UE based on the relative location information and location information of the second UE.

S8011. The AMF sends a positioning request response message to the external AF.

In step S8011, the AMF may first send the positioning request response message (that is, a response message of the second positioning request message initiated by the GMLC) to the GMLC, and then the GMLC forwards the positioning request response message to the external AF.

It should be noted that the AMF in the embodiment shown in FIG. 8A and FIG. 8B performs the method performed by the LMF in the embodiment shown in FIG. 6A and FIG. 6B. For steps S801 to S803 and S806 to S8011 in the embodiment shown in FIG. 8A and FIG. 8B, refer to descriptions of steps S601 to S603 and S606 to S6011 in the embodiment shown in FIG. 6A and FIG. 6B. Details are not described herein again. A difference between the embodiment shown in FIG. 8A and FIG. 8B and the embodiment shown in FIG. 6A and FIG. 6B lies in that in the embodiment shown in FIG. 6A and FIG. 6B, the LMF determines the second UE, and the LMF sends the third positioning request message to the second UE, but in the embodiment shown in FIG. 8A and FIG. 8B, the AMF determines the second UE, and the AMF sends the third positioning request message to the first UE. For specific implementation of step S804 in the embodiment shown in FIG. 8A and FIG. 8B, refer to step S604 in the embodiment shown in FIG. 6A and FIG. 6B. Details are not described herein again.

Certainly, it may be understood that after step S804 is performed, the AMF may alternatively forward the selected second UE and the determined positioning algorithm to the LMF, and the LMF sends the third positioning request message to the second UE. Alternatively, after step S803, the AMF may forward, to the LMF, the second positioning request message sent by the GMLC, and the LMF determines the identification information of the second UE. In S805, the LMF sends the third positioning request message to the second UE.

In the positioning method in the embodiment shown in FIG. 8A and FIG. 8B, the GMLC may send a positioning request message to the AMF, to indicate the AMF to position the target UE through auxiliary UE, and then the AMF may send the request message to the target UE, to indicate the target UE to calculate a relative location between the target UE and the auxiliary UE, so that the target UE sends the relative location to the AMF, and the AMF calculates location information of the target UE.

The foregoing mainly describes the solutions provided in this application from a perspective of interaction between the network elements. It may be understood that, to implement the foregoing function, each network element includes a corresponding hardware structure and/or software module for executing each function. A person of ordinary skill in the art should easily be aware that, in combination with the examples described in embodiments disclosed in this specification, units and algorithm steps may be implemented by hardware or a combination of hardware and computer software. Whether a function is performed by hardware or hardware driven by computer software depends on particular applications and design constraint conditions of the technical solutions. A person skilled in the art may use different methods to implement the described function for each particular application, but it should not be considered that the implementation goes beyond the scope of the present disclosure.

With reference to the accompanying drawings, the following describes apparatuses configured to implement the foregoing methods in embodiments of this application. Therefore, all the foregoing content may be used in the following embodiments. Repeated content is not described again.

Figure 9:
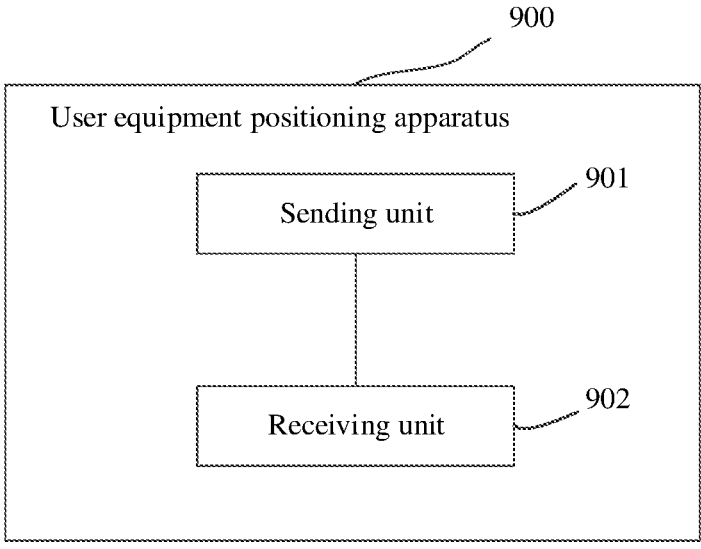
FIG. 9 is a schematic diagram of a logical structure of a user equipment UE positioning apparatus according to an embodiment of this application.

Based on a same concept as that of the foregoing method embodiments, an embodiment of this application provides a user equipment positioning apparatus. When an integrated unit is used, FIG. 9 is a schematic diagram of a logical structure of a user equipment positioning apparatus. The user equipment positioning apparatus may be performed by a first network element (for example, a GMLC). Refer to FIG. 9. The user equipment positioning apparatus 900 includes a sending unit 901 and a receiving unit 902. In an example, the apparatus 900 is configured to implement a function of the first network element in the foregoing methods. For example, the apparatus may be the first network element, or may be an apparatus, for example, a chip system, in the first network element.

The sending unit 901 is configured to send a first positioning request message to a second network element. The first positioning request message indicates the second network element to position first user equipment UE through second UE. The receiving unit 902 is configured to receive a first positioning request response message sent by the second network element. The first positioning request response message includes first location information of the first UE.

In a possible implementation, the first positioning request message includes at least one of the following information:

identification information of the first UE, identification information of the second UE, or positioning precision information.

In a possible implementation, the sending unit 901 is further configured to send a second positioning request message to the second network element. The second positioning request message indicates the second network element to position the first UE. The receiving unit 902 is further configured to receive a second positioning request response message sent by the second network element. The second positioning request response message includes second location indication information of the first UE. The second location indication information indicates that precision information of a second location of the first UE does not meet the positioning precision information, or indicates second location information of the first UE.

In a possible implementation, the sending unit 901 is configured to send the first positioning request message to the second network element in the following manner sending the first positioning request message to the second network element based on the second location indication information of the first UE.

When a hardware form is used for implementation, in this embodiment of this application, the sending unit 901 may be a communication interface, a transmitter, a transceiver circuit, or the like. The receiving unit 902 may be a communication interface, a receiver, a transceiver circuit, or the like. The communication interface is a general term, and may include one or more interfaces.

Figure 10:
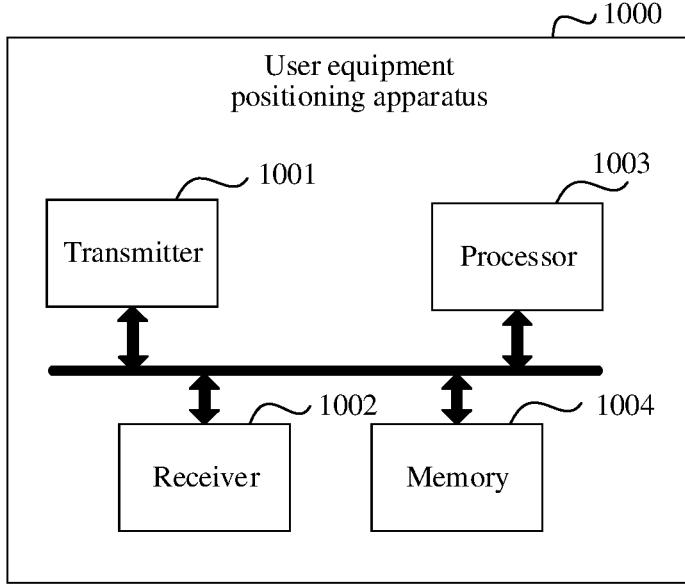
FIG. 10 is a schematic diagram of a structure of a user equipment UE positioning apparatus according to an embodiment of this application.

When the sending unit 901 is a transmitter and the receiving unit 902 is a receiver, the user equipment positioning apparatus 900 in this embodiment of this application may be shown in FIG. 10. As shown in FIG. 10, an embodiment of this application provides a user equipment positioning apparatus 1000. For example, the positioning apparatus may be a first network element. The user equipment positioning apparatus 1000 may include a transmitter 1001, a receiver 1002, a processor 1003, and a memory 1004. The memory 1004 stores instructions or a program. The processor 1003 is configured to execute the instructions or the program stored in the memory 1004. The transmitter 1001 is configured to perform an operation performed by the sending unit 901 in the foregoing embodiment. The receiver 1002 is configured to perform an operation performed by the receiving unit 902 in the foregoing embodiment.

It should be understood that the user equipment positioning apparatus 900 or the user equipment positioning apparatus 1000 according to embodiments of this application may correspond to the first network element in the embodiment shown in FIG. 3 and the GMLC network element in the embodiments shown in FIG. 4A and FIG. 4B, FIG. 6A and FIG. 6B, FIG. 7A and FIG. 7B, and FIG. 8A and FIG. 8B. In addition, operations and/or functions of the modules in the user equipment positioning apparatus 900 or the user equipment positioning apparatus 1000 are separately used to implement corresponding procedures in the embodiments shown in FIG. 3, FIG. 4A and FIG. 4B, FIG. 6A and FIG. 6B, FIG. 7A and FIG. 7B, and FIG. 8A and FIG. 8B. For brevity, details are not described herein again.

Figure 11:
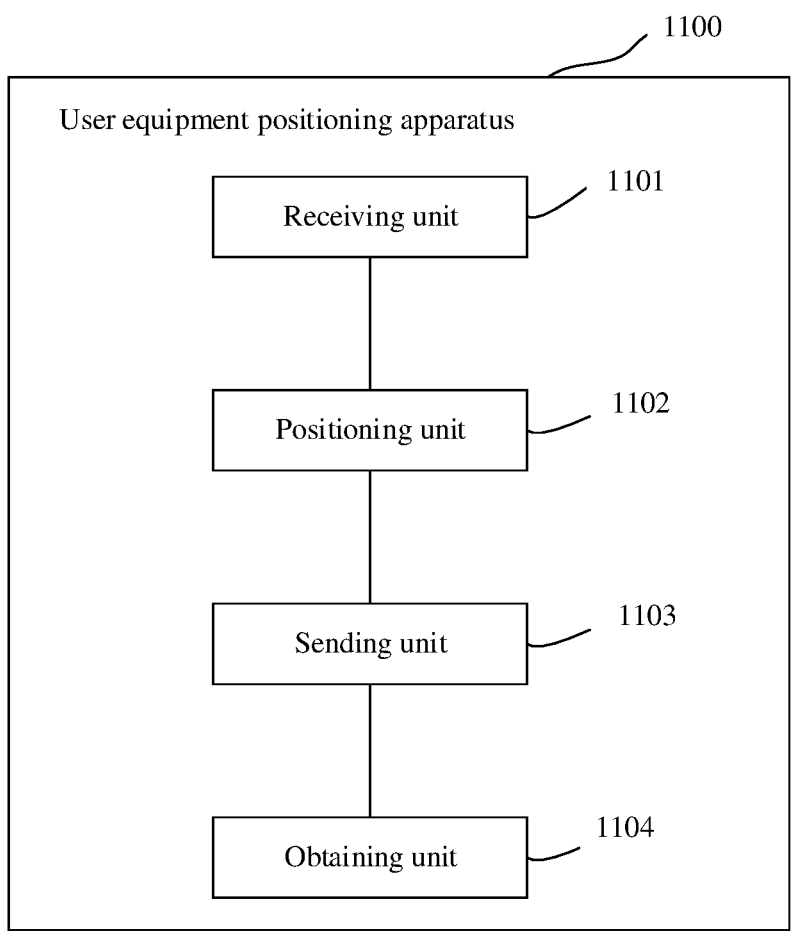
FIG. 11 is a schematic diagram of a logical structure of a user equipment UE positioning apparatus according to an embodiment of this application.

As shown in FIG. 11, an embodiment of this application further provides a schematic diagram of a logical structure of a user equipment positioning apparatus. Refer to FIG. 11. The user equipment positioning apparatus 1100 includes a receiving unit 1101, a positioning unit 1102, and a sending unit 1103. In an example, the apparatus 1100 is configured to implement a function of the second network element in the foregoing methods. For example, the apparatus may be an LMF, or may be an apparatus, for example, a chip system, in the LMF.

The receiving unit 1101 is configured to receive a first positioning request message sent by a first network element. The first positioning request message indicates the second network element to position first user equipment UE through second UE. The positioning unit 1102 is configured to position the first UE. The sending unit 1103 is configured to send a first positioning request response message to the first network element. The first positioning request response message includes location information of the first UE.

In a possible implementation, the first positioning request message includes at least one of the following information: identification information of the first UE, identification information of the second UE, or positioning precision information.

In a possible implementation, the positioning unit 1102 is configured to position the first UE through the second UE in the following manner sending a third positioning request message to the second UE, where the third positioning request message indicates the second UE to determine relative location information between the second UE and the first UE, and the third positioning request message includes the identification information of the first UE; receiving the relative location information sent by the second UE, and determining location information of the second UE based on the identification information of the second UE; and determining the location information of the first UE based on the relative location information and the location information of the second UE.

In a possible implementation, the apparatus further includes an obtaining unit 1104. The obtaining unit 1104 is configured to obtain the identification information of the second UE.

The obtaining unit 1104 is configured to obtain the identification information of the second UE in the following manner obtaining the identification information of the second UE from a third network element; obtaining the identification information of the second UE from the first network element; or obtaining the identification information of the second UE based on registration information of the second UE.

In a possible implementation, the positioning unit 1102 is configured to position the first UE through the second UE in the following manner sending a fourth positioning request message to the first UE, where the fourth positioning request message indicates the first UE to determine relative location information between the first UE and the second UE, and the fourth positioning request message includes the identification information of the second UE; receiving the relative location information sent by the first UE, and determining location information of the second UE based on the identification information of the second UE; and determining the location information of the first UE based on the relative location information and the location information of the second UE.

When a hardware form is used for implementation, in this embodiment of this application, the receiving unit 1101 may be a communication interface, a receiver, a transceiver circuit, or the like. The sending unit 1103 may be a communication interface, a transmitter, a transceiver circuit, or the like. The communication interface is a general term, and may include one or more interfaces.

Figure 12:
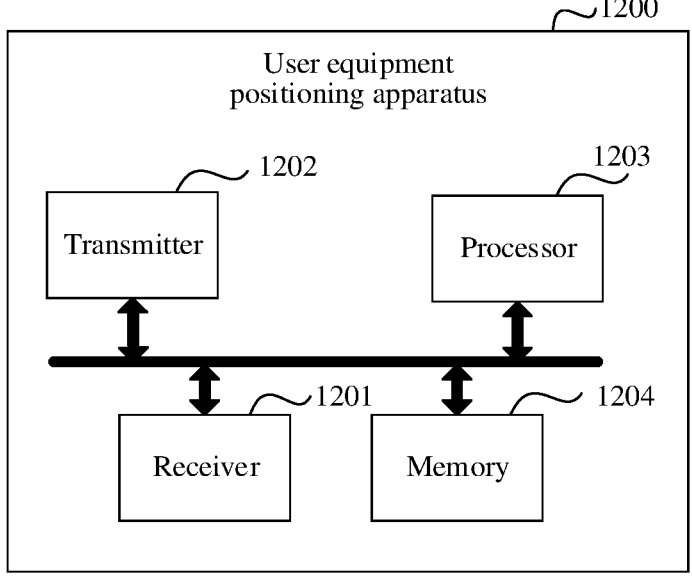
FIG. 12 is a schematic diagram of a structure of a user equipment UE positioning apparatus according to an embodiment of this application.

When the receiving unit 1101 is a receiver and the sending unit 1103 is a transmitter, the user equipment positioning apparatus 1100 in this embodiment of this application may be shown in FIG. 12. As shown in FIG. 12, an embodiment of this application provides a user equipment positioning apparatus 1200. For example, the positioning apparatus may be a second network element. The user equipment positioning apparatus 1200 may include a receiver 1201, a transmitter 1202, a processor 1203, and a memory 1204. The memory 1204 stores instructions or a program. The processor 1203 is configured to execute the instructions or the program stored in the memory 1204. The receiver 1201 is configured to perform an operation performed by the receiving unit 1101 in the foregoing embodiment. The transmitter 1202 is configured to perform an operation performed by the sending unit 1103 in the foregoing embodiment.

It should be understood that the user equipment positioning apparatus 1100 or the user equipment positioning apparatus 1200 according to embodiments of this application may correspond to the second network element in the embodiment shown in FIG. 3, the LMF network element in the embodiments shown in FIG. 4A and FIG. 4B and FIG. 6A and FIG. 6B, or the AMF network element in the embodiments shown in FIG. 7A and FIG. 7B and FIG. 8A and FIG. 8B. In addition, operations and/or functions of the modules in the user equipment positioning apparatus 1100 or the user equipment positioning apparatus 1200 separately implement corresponding procedures in the embodiments shown in FIG. 3, FIG. 4A and FIG. 4B, FIG. 6A and FIG. 6B, FIG. 7A and FIG. 7B, and FIG. 8A and FIG. 8B. For brevity, details are not described herein again.

It should be understood that, the processor mentioned in the embodiments of this application may be a central processing unit (CPU), the processor may further be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification is intended to include but is not limited to these memories and any memory of another proper type.

Figure 13:
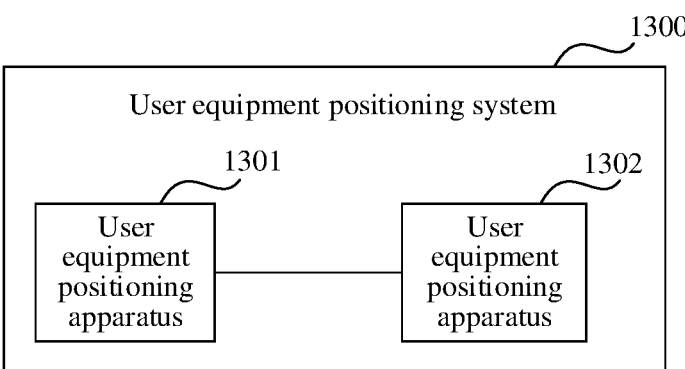
FIG. 13 is a schematic diagram of a structure of a user equipment UE positioning system according to an embodiment of this application.

Further, FIG. 13 is a schematic diagram of a user equipment positioning system 1300 according to an embodiment of this application. The system 1300 may include a user equipment positioning apparatus 1301 and a user equipment positioning apparatus 1302. For example, the user equipment positioning apparatus 1301 may be configured to send a first positioning request message to the user equipment positioning apparatus 1302. The first positioning request message indicates the user equipment positioning apparatus 1302 to position first user equipment UE through second UE. The user equipment positioning apparatus 1302 may be configured to: receive the first positioning request message sent by the user equipment positioning apparatus 1301, where the first positioning request message indicates the user equipment positioning apparatus 1302 to position the first user equipment UE through the second UE; position the first UE, and send a first positioning request response message to the user equipment positioning apparatus 1301, where the first positioning request response message includes location information of the first UE.

It may be understood that, for a specific implementation process and a corresponding beneficial effect of the system when the system is used for the user equipment positioning method, refer to related descriptions in the foregoing method embodiments, and details are not described herein again.

Based on a same concept as that of the foregoing method embodiments, an embodiment of this application further provides a computer-readable storage medium. The computer-readable storage medium stores a computer program. When the program is executed by a processor, a computer is enabled to perform an operation performed by the first network element or the second network element in any one of the foregoing method embodiments and the possible implementations of the method embodiments.

Based on a same concept as that of the foregoing method embodiments, this application further provides a computer program product. When the computer program product is invoked and executed by a computer, the computer may be enabled to implement an operation performed by the first network element or the second network element in any one of the foregoing method embodiments and the possible implementations of the method embodiments.

Based on a same concept as that of the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement an operation performed by the first network element or the second network element in any one of the foregoing method embodiments and the possible implementations of the method embodiments. The chip system may include the chip, or may include the chip and another discrete component, such as a memory (or a storage module) and/or a transceiver (or a communication module).

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described function for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium such as a USB flash drive, a removable hard disk, a read-only memory (ROM), a random access memory (RAM), a magnetic disk, or an optical disc, that can store program code.

The foregoing descriptions are merely example implementations of this application, but are not intended to limit the protection scope of embodiments of this application. Any variation or replacement readily figured out by a person skilled in the art within the technical scope disclosed in embodiments of this application shall fall within the protection scope of this application. Therefore, the protection scope of embodiments of this application shall be subject to the protection scope of the claims.

What is claimed is:

1. A user equipment positioning method, comprising:
sending, by a gateway mobile location center, a first positioning request message to a location management function network element, wherein the first positioning request message indicates to position first user equipment (UE) through second UE, and the first positioning request message comprises identification information of the first UE and identification information of the second UE; and
receiving, by the gateway mobile location center, a first positioning request response message from the location management function network element, wherein the first positioning request response message comprises first location information of the first UE, wherein the first location information of the first UE is determined based on location information of the second UE and relative location information between the first UE and the second UE.

2. The user equipment positioning method according to claim 1, wherein the first positioning request message further comprises positioning precision information.

3. The user equipment positioning method according to claim 2, wherein before the sending, by the gateway mobile location center, the first positioning request message to the location management function network element, the user equipment positioning method further comprises:
sending, by the gateway mobile location center, a second positioning request message to the location management function network element, wherein the second positioning request message indicates to position the first UE; and
receiving, by the gateway mobile location center, a second positioning request response message from the location management function network element, wherein the second positioning request response message comprises second location indication information of the first UE, and the second location indication information indicates that precision information of a second location of the first UE does not meet the positioning precision information, or indicates second location information of the first UE.

4. The user equipment positioning method according to claim 3, wherein the sending, by the gateway mobile location center, the first positioning request message to the location management function network element comprises:
sending, by the gateway mobile location center, the first positioning request message to the location management function network element based on the second location indication information of the first UE.

5. The user equipment positioning method according to claim 1, further comprising:
receiving, by the location management function network element, the first positioning request message; and
positioning, by the location management function network element, the first UE through the second UE, and sending the first positioning request response message to the gateway mobile location center, wherein the positioning, by the location management function network element, the first UE through the second UE comprises:

sending, by the location management function network element, a fourth positioning request message to the first UE, wherein the fourth positioning request message indicates to determine the relative location information between the first UE and the second UE, the fourth positioning request message comprises the identification information of the second UE;
receiving, by the location management function network element, the relative location information from the first UE, and determining the location information of the second UE based on the identification information of the second UE; and
determining, by the location management function network element, the location information of the first UE based on the relative location information and the location information of the second UE.

6. A user equipment positioning method, comprising:
receiving, by a location management function network element, a first positioning request message from a gateway mobile location center, wherein the first positioning request message indicates to position first user equipment (UE) through second UE, and the first positioning request message comprises identification information of the first UE and identification information of the second UE; and
positioning, by the location management function network element, the first UE through the second UE, and sending a first positioning request response message to the gateway mobile location center, wherein the first positioning request response message comprises location information of the first UE, and the positioning, by the location management function network element, the first UE through the second UE comprises:
sending, by the location management function network element, a fourth positioning request message to the first UE, wherein the fourth positioning request message indicates to determine relative location information between the first UE and the second UE, the fourth positioning request message comprises the identification information of the second UE;
receiving, by the location management function network element, the relative location information from the first UE, and determining location information of the second UE based on the identification information of the second UE; and
determining, by the location management function network element, the location information of the first UE based on the relative location information and the location information of the second UE.

7. The user equipment positioning method according to claim 6, wherein the first positioning request message further comprises positioning precision information.

8. The user equipment positioning method according to claim 6, wherein the fourth positioning request message further comprises a positioning algorithm.

9. A user equipment positioning apparatus, comprising:
a processor; and
a memory having instructions stored thereon that, when executed by the processor cause the user equipment positioning apparatus to:
send a first positioning request message to a location management function network element, wherein the first positioning request message indicates to position first user equipment (UE) through second UE, and the first positioning request message comprises identification information of the first UE and identification information of the second UE; and receive a first positioning request response message from the location management function network element, wherein the first positioning request response message comprises first location information of the first UE, wherein the first location information of the first UE is determined based on location information of the second UE and relative location information between the first UE and the second UE.

10. The user equipment positioning apparatus according to claim 9, wherein the first positioning request message further comprises positioning precision information.

11. The user equipment positioning apparatus according to claim 10, wherein the user equipment positioning apparatus is further caused to:

send a second positioning request message to the location management function network element, wherein the second positioning request message indicates to position the first UE; and receive a second positioning request response message from the location management function network element, wherein the second positioning request response message comprises second location indication information of the first UE, and the second location indication information indicates that precision information of a second location of the first UE does not meet the positioning precision information, or indicates second location information of the first UE.

12. The user equipment positioning apparatus according to claim 11, wherein the user equipment position apparatus is caused to send the first positioning request message to the location management function network element based on the second location indication information of the first UE.

13. A user equipment positioning apparatus, comprising:

a processor; and a memory having instructions stored thereon that, when executed by the processor cause the user equipment positioning apparatus to:

receive a first positioning request message from a gateway mobile location center, wherein the first positioning request message indicates to position first user equipment (UE) through second UE, and the first positioning request message comprises identification information of the first UE and identification information of the second UE; and position the first UE through the second UE and send a first positioning request response message to the gateway mobile location center, wherein the first positioning request response message comprises location information of the first UE, and to position the first UE through the second UE, the user equipment positioning apparatus is caused to:

send a fourth positioning request message to the first UE, wherein the fourth positioning request message indicates to determine relative location information between the first UE and the second UE, the fourth positioning request message comprises the identification information of the second UE;

receive the relative location information from the first UE, and determine location information of the second UE based on the identification information of the second UE; and determine the location information of the first UE based on the relative location information and the location information of the second UE.

14. The user equipment positioning apparatus according to claim 13, wherein the first positioning request message further comprises positioning precision information.

15. The user equipment positioning apparatus according to claim 14, wherein the fourth positioning request message further comprises a positioning algorithm.

16. The user equipment positioning apparatus according to claim 13, wherein the fourth positioning request message further comprises a positioning algorithm.

17. A system, comprising:

a gateway mobile location center; and a location management function network element, wherein the gateway mobile location center is configured to:

send a first positioning request message to the location management function, wherein the first positioning request message indicates to position first user equipment (UE) through second UE, and the first positioning request message comprises identification information of the first UE and identification information of the second UE; and receive a first positioning request response message from the location management function, wherein the first positioning request response message comprises first location information of the first UE, wherein the first location information of the first UE is determined based on location information of the second UE and relative location information between the first UE and the second UE, and the location management function network element is configured to:

receive the first positioning request message from the gateway mobile location center; and position the first UE through the second UE and send the first positioning request response message to the gateway mobile location center, wherein to position the first UE through the second UE, the location management function is configured to:

send a fourth positioning request message to the first UE, wherein the fourth positioning request message indicates to determine relative location information between the first UE and the second UE, the fourth positioning request message comprises the identification information of the second UE;

receive the relative location information from the first UE, and determine location information of the second UE based on the identification information of the second UE; and determine the location information of the first UE based on the relative location information and the location information of the second UE.

18. The system according to claim 17, wherein the fourth positioning request message further comprises a positioning algorithm.

19. The system according to claim 17, wherein the first positioning request message further comprises positioning precision information.

\* \* \* \* \*